(12) United States Patent
Kim

(10) Patent No.: US 11,458,811 B2
(45) Date of Patent: Oct. 4, 2022

(54) HEAT PUMP SYSTEM FOR VEHICLE

(71) Applicants: Hyundai Motor Company, Seoul (KR); Kia Motors Corporation, Seoul (KR)

(72) Inventor: Jae Yeon Kim, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 233 days.

(21) Appl. No.: 16/890,491

(22) Filed: Jun. 2, 2020

(65) Prior Publication Data
US 2021/0129627 A1 May 6, 2021

(30) Foreign Application Priority Data
Nov. 4, 2019 (KR) .................. 10-2019-0139369

(51) Int. Cl.
*B60H 1/00* (2006.01)
*B60H 1/22* (2006.01)
(Continued)

(52) U.S. Cl.
CPC ......... *B60H 1/00899* (2013.01); *B60H 1/005* (2013.01); *B60H 1/00007* (2013.01); *B60H 1/00278* (2013.01); *B60H 1/00428* (2013.01); *B60H 1/00921* (2013.01); *B60H 1/143* (2013.01); *B60H 1/22* (2013.01);
(Continued)

(58) Field of Classification Search
CPC ............ B60H 1/00899; B60H 1/00007; B60H 1/00278; B60H 1/005; B60H 1/143; B60H 1/22; B60H 1/32284; B60H 2001/00307; B60H 2001/00942; B60H 1/00428; B60H 1/00921; B60H 1/00392; B60H 1/004; B60H 1/04; B60H 1/2225; B60H 1/3213; B60H 2001/00928; B60K 1/00; B60K 2001/005; B60L 58/24; B60L 58/26;
(Continued)

(56) References Cited

U.S. PATENT DOCUMENTS

| 8,215,432 B2 | 7/2012 | Nemesh et al. |
| 8,899,062 B2 | 12/2014 | Kadle et al. |

(Continued)

FOREIGN PATENT DOCUMENTS

| CN | 103380339 B | 1/2016 |
| JP | 5336033 B2 | 11/2013 |

*Primary Examiner* — Ljiljana V. Cinc
(74) *Attorney, Agent, or Firm* — Slater Matsil, LLP

(57) ABSTRACT

A system for a vehicle includes a cooling apparatus including a radiator, a first water pump, a first valve, and a reservoir tank which are connected through a coolant line, the cooling apparatus configured to circulate a coolant in the coolant line to cool at least one electrical component, a battery cooling apparatus including a battery coolant line connected to the coolant line through a second valve, and a second water pump and a battery module which are connected through the battery coolant line, a heating apparatus including a heating line connected to the coolant line through a third valve, a third water pump provided on the heating line, and a heater, an air conditioner including a condenser that is connected to the heating line, and a chiller provided in the battery coolant line between the second valve and the battery module.

20 Claims, 8 Drawing Sheets

(51) Int. Cl.
*B60H 1/14* (2006.01)
*B60H 1/32* (2006.01)

(52) U.S. Cl.
CPC .................. *B60H 1/32284* (2019.05); *B60H 2001/00307* (2013.01); *B60H 2001/00928* (2013.01); *B60H 2001/00942* (2013.01); *Y02T 10/70* (2013.01)

(58) Field of Classification Search
CPC ............ H01M 10/613; H01M 10/625; H01M 10/6567; H01M 10/6568; Y02E 60/10; Y02T 10/70
See application file for complete search history.

(56) References Cited

U.S. PATENT DOCUMENTS

| | | |
|---|---|---|
| 9,109,840 B2 | 8/2015 | Kadle et al. |
| 9,239,193 B2 | 1/2016 | Kadle et al. |
| 10,118,458 B2 * | 11/2018 | Kim .................. B60H 1/00278 |
| 10,183,544 B2 * | 1/2019 | Kim ...................... F25B 25/005 |
| 11,318,816 B2 * | 5/2022 | Kim .................. B60H 1/32281 |
| 11,358,435 B2 * | 6/2022 | Kim .................. B60H 1/00485 |
| 2013/0283838 A1 | 10/2013 | Kadle et al. |
| 2017/0158081 A1 * | 6/2017 | Kim .................. H01M 10/6568 |
| 2018/0117985 A1 * | 5/2018 | Kim ...................... B60H 3/024 |
| 2018/0117986 A1 * | 5/2018 | Kim .................. B60H 1/00278 |
| 2019/0381857 A1 * | 12/2019 | Lee .................... B60H 1/00278 |
| 2020/0122545 A1 * | 4/2020 | Lee .................... B60H 1/00278 |
| 2020/0180391 A1 * | 6/2020 | Kim ...................... B60H 1/3223 |
| 2020/0338950 A1 * | 10/2020 | Kim .................. B60H 1/00921 |
| 2020/0369108 A1 * | 11/2020 | Kim .................. B60H 1/00571 |
| 2020/0398641 A1 * | 12/2020 | Kim .................. B60H 1/00278 |
| 2021/0053412 A1 * | 2/2021 | Kim ........................ B60L 58/27 |
| 2021/0061067 A1 * | 3/2021 | Kim .................. B60H 1/00921 |
| 2021/0129627 A1 * | 5/2021 | Kim .................. B60H 1/00278 |
| 2021/0138867 A1 * | 5/2021 | Kim ...................... B60H 3/024 |
| 2021/0379960 A1 * | 12/2021 | Kim .................. B60H 1/00485 |
| 2021/0379962 A1 * | 12/2021 | Kim ........................ B60H 1/22 |
| 2021/0387505 A1 * | 12/2021 | Kim .................. H01M 10/625 |
| 2022/0032736 A1 * | 2/2022 | Kim .................. B60H 1/00899 |

* cited by examiner

HEAT PUMP SYSTEM FOR VEHICLE

CROSS-REFERENCE TO RELATED APPLICATIONS

This application claims priority to Korean Patent Application No. 10-2019-0139369, filed in the Korean Intellectual Property Office on Nov. 4, 2019, which application is hereby incorporated herein by reference.

TECHNICAL FIELD

The present invention relates to a heat pump system for a vehicle.

BACKGROUND

Generally, an air conditioner system for a vehicle includes an air conditioner for circulating a refrigerant to heat or cool an interior of the vehicle.

The air conditioner, which can maintain a fresh indoor condition by maintaining an indoor temperature of a vehicle at an appropriate temperature regardless of an outdoor temperature change, is configured to heat or cool an interior of the vehicle by heat-exchange by a condenser and an evaporator during a process in which a refrigerant discharged by driving a compressor is circulated to the compressor again by passing through a condenser, a receiver drier, an expansion valve, and the evaporator.

That is, in the air conditioner, a high-temperature and high-pressure gaseous refrigerant compressed by the compressor is condensed through the condenser, then is evaporated by the evaporator through the receiver drier and the expansion valve to lower the indoor temperature and humidity in a summer cooling mode.

Recently, as concerns about energy efficiency and environmental pollution have gradually increased, development of an environmentally friendly vehicle capable of being substantially substituted for a vehicle having an internal combustion engine has been required, and the environmentally friendly vehicles are typically classified into an electric vehicle which is typically driven using a fuel cell or electricity as a power source, and a hybrid vehicle which is driven using an engine and an electric battery.

In the electric vehicle and the hybrid vehicle of the environmentally friendly vehicles, a separate heater is not used, unlike a general vehicle that uses an air conditioner, and an air conditioner which is applied to the environmentally friendly vehicle is typically referred to as a heat pump system.

In a case of the electric vehicle using the fuel cell, chemical reaction energy of oxygen and hydrogen is converted into electrical energy to generate driving force, and during this process, heat energy is generated by chemical reaction in the fuel cell, and as a result, effective removal of the generated heat is required to secure the performance of the fuel cell.

Even in the hybrid vehicle, the driving force is generated by driving the motor by using electricity supplied from the fuel cell or the electric battery together with the engine that is actuated with a general fuel, and as a result, the performance of the motor can be secured only by effectively removing the heat generated from the fuel cell or the battery, and the motor.

Accordingly, in a hybrid vehicle or electric vehicle of a prior art, a battery cooling system, a cooling part, and a heat pump system should be configured to have respective separate circuits to prevent heat generation of a motor, electrical equipment, and a battery including a fuel cell.

Thus, the size and weight of a cooling module disposed in the front of the vehicle are increased, and a layout of connection pipes for supplying a refrigerant or coolant to the heat pump system, the cooling apparatus, and the battery cooling system, in an engine compartment becomes complicated.

In addition, since a battery cooling system for heating and cooling the battery depending on a vehicle state is separately provided to enable the battery to output optimal performance, a plurality of valves for connection pipes are employed, and thereby ride comfort may be deteriorated since noise and vibration due to frequent opening and closing operation may be transmitted to an interior of the vehicle.

The above information disclosed in this Background section is only for enhancement of understanding of the background of the invention, and therefore it may contain information that does not form the prior art that is already known to a person of ordinary skill in the art.

SUMMARY

The present invention relates to a heat pump system for a vehicle. Particular embodiments relate to a heat pump system for a vehicle which adjusts a temperature of a battery module by using one chiller that performs heat exchange between a refrigerant and a coolant and improves heating efficiency by using waste heat generated from an electrical component.

Embodiments of the present invention provide a heat pump system for a vehicle, which adjusts a temperature of a battery module by using one chiller that performs heat exchange between a refrigerant and a coolant and improves heating efficiency by using waste heat generated from an electrical component.

An exemplary embodiment of the present invention provides a heat pump system for the vehicle, including a cooling apparatus configured to include a radiator, a first water pump, a first valve, and a reservoir tank which are connected through a coolant line, and to circulate a coolant in the coolant line to cool at least one electrical component provided in the coolant line, a battery cooling apparatus configured to include a battery coolant line connected to the coolant line through a second valve, and a second water pump and a battery module which are connected through the battery coolant line to circulate the coolant in the battery module, a heating apparatus including a heating line connected to the coolant line through a third valve to heat a vehicle interior by using a coolant and a third water pump provided on the heating line, and a heater, and a chiller provided in the battery coolant line between the second valve and the battery module, connected to a refrigerant line of an air conditioner through a refrigerant connection line, and configured to regulate the temperature of the coolant by performing heat exchange between the coolant that circulates the battery coolant line and the refrigerant that is selectively supplied from the air conditioner, wherein a condenser included in the air conditioner is connected to the heating line so as to pass the coolant circulating through the heating apparatus.

The cooling apparatus may be provided with a first branch line, a first end of the first branch line may be connected to the first valve and a second end of the first branch line may be connected to the coolant line between the radiator and the first water pump, and the heater may be provided inside an HVAC module included in the air conditioner.

When the battery module is heated, the first branch line may be opened in a state in which the coolant line connected to the radiator is closed through the operation of the first valve, the coolant line and the battery coolant line may be connected through an operation of the second valve, the coolant may be circulated along the coolant line and the battery coolant line through an operation of the first and second water pumps, in the heating apparatus, the coolant line and the heating line may be connected through the operation of the third valve, in the cooling apparatus, the coolant with the temperature increased by the waste heat of the electrical component circulates through the heating line through the operation of the third water pump, and a high-temperature coolant introduced from the heating line to the coolant line may be flowed into the battery coolant line through the first branch line and the coolant line, and may be supplied to the battery module.

The air conditioner may include an HVAC module configured to include an evaporator that is connected thereto through the refrigerant line and an opening and closing door configured to control outside air passing through the evaporator to be selectively introduced into the heater depending on cooling, heating, and heating and dehumidification modes of the vehicle therein, the condenser connected with the heating line to circulate a coolant therein to perform heat exchange between the coolant and a refrigerant supplied through the refrigerant line, a compressor connected between the evaporator and the condenser through the refrigerant line, a heat exchanger provided on the refrigerant line between the condenser and the evaporator, a first expansion valve provided in the refrigerant line between the heat exchanger and the evaporator, a second expansion valve provided in the refrigerant connection line, an accumulator provided in the refrigerant line between the evaporator and the compressor and connected to the refrigerant connection line, and a third expansion valve provided in the refrigerant line between the condenser and the heat exchanger.

The heat exchanger may additionally condense or evaporate the refrigerant condensed in the condenser through heat exchange with the outside air depending on the selective operation of the third expansion valve.

The second expansion valve may expand the refrigerant introduced through the refrigerant connection line to flow to the chiller when cooling the battery module by the refrigerant.

The third expansion valve may selectively expand the refrigerant introduced to the heat exchanger in a heating mode and a heating and dehumidification mode of the vehicle.

A first end of the refrigerant connection line may be connected to the refrigerant line between the heat exchanger and the first expansion valve, and a second end of the refrigerant connection line may be connected to the accumulator.

The HVAC module may further include an air heater provided at an opposite side of the evaporator, with the heater interposed therebetween to selectively heat outside air passing through the heater.

The air heater may be operated to raise a temperature of the outside air passing through the heater when a temperature of a coolant supplied to the heater is lower than a target temperature for interior heating.

When the battery module is cooled in the cooling mode of the vehicle, a coolant may circulate through the coolant line by an operation of the first water pump in the cooling apparatus, the first branch line may be closed through an operation of the first valve, the coolant line and the battery coolant line may form an independent closed circuit by the operation of the second valve, respectively, in the battery cooling apparatus, the coolant which passes through the chiller may be supplied to the battery module along the battery coolant line by the operation of the second water pump, in the heating apparatus, the coolant line and the heating line may be connected through the operation of the third valve so that the coolant is supplied from the cooling apparatus, in the air conditioner, in a state that the refrigerant connection line may be opened through the operation of the second expansion valve, the refrigerant circulates along the refrigerant line and the refrigerant connection line, the first and second expansion valves may expand the refrigerant so that the expanded refrigerant is respectively supplied to the evaporator and the chiller, and the third expansion valve may inflow the refrigerant supplied from the condenser to the heat exchanger.

The heating apparatus may supply the coolant supplied from the cooling apparatus through the operation of the third water pump to the condenser, and the condenser may condense the refrigerant through heat exchange with the coolant, and the heat exchanger may additionally condense the refrigerant introduced from the condenser through heat exchange with the outside air.

When recovering the waste heat of the external heat source, the electrical component, and the battery module in a heating mode of the vehicle, the first branch line may be opened through an operation of the first valve, in the cooling apparatus, on the basis of the first branch line, a portion of the coolant line connected to the radiator may be closed, and the coolant passing through the electrical component may be circulated along the opened first branch line and the coolant line without passage through the radiator through the operation of the first water pump, in the battery cooling apparatus, the coolant line and the battery coolant line may be connected through the operation of the second valve, and the coolant passing through the battery module may be supplied to the chiller through an operation of the second water pump, the coolant line and the heating line may form an independent closed circuit through an operation of the third valve, in the heating apparatus, the coolant may circulate along the heating line through an operation of the third water pump, in the air conditioner, the refrigerant line connecting the condenser and the evaporator may be closed through the operation of the first expansion valve, the refrigerant connection line may be opened through the operation of the second expansion valve, the second expansion valve may expand the refrigerant supplied to the refrigerant connection line to be supplied to the chiller, and the third expansion valve may expand the refrigerant supplied from the condenser to be supplied to the heat exchanger.

The battery cooling apparatus may further include a second branch line, a first end of the second branch line may be connected to a fourth valve provided between the second water pump and the battery module, and a second end of the second branch line may be connected to the battery coolant line connecting the battery module and the chiller.

When recovering the waste heat of the external heat source, and the electrical component in a heating mode of the vehicle, the first branch line may be opened through an operation of the first valve, in the cooling apparatus, on the basis of the first branch line, a portion of the coolant line connected to the radiator may be closed, and the coolant passing through the electrical component may be circulated along the opened first branch line and the coolant line without passage through the radiator through the operation of the first water pump, in the battery cooling apparatus, the coolant line and the battery coolant line may be connected through the operation of the second valve, in the state in which the second branch line is opened through an operation of the fourth valve, the battery coolant line connected to the battery module based on the second branch line may be closed, and the coolant may be circulated along the battery coolant line and the second branch line through an operation of the second water pump, the coolant passing through the electrical component may be supplied to the chiller through the operation of the first and second water pumps, the coolant line and the heating line may form an independent closed circuit through an operation of the third valve, in the heating apparatus, the coolant may circulate along the heating line through an operation of the third water pump, in the air conditioner, the refrigerant line connecting the condenser and the evaporator may be closed through the operation of the first expansion valve, the refrigerant connection line may be opened through the operation of the second expansion valve, the second expansion valve may expand the refrigerant supplied to the refrigerant connection line to be supplied to the chiller, and the third expansion valve may expand the refrigerant supplied from the condenser to be supplied to the heat exchanger.

In a heating and dehumidification mode of the vehicle, the first branch line may be opened through an operation of the first valve, in the cooling apparatus, on the basis of the first branch line, a portion of the coolant line connected to the radiator may be closed, and the coolant passing through the electrical component may be circulated along the opened first branch line and the coolant line without passage through the radiator through the operation of the first water pump, in the battery cooling apparatus, the coolant line and the battery coolant line may be connected through the operation of the second valve, and the coolant passing through the battery module may be supplied to the chiller through an operation of the second water pump, the coolant discharged from the chiller may be flowed into the coolant line connected to the battery coolant line through the second valve, the coolant line and the heating line may form an independent closed circuit through an operation of the third valve, in the heating apparatus, the coolant may circulate along the heating line through an operation of the third water pump, in the air conditioner, the refrigerant may be circulated along the opened refrigerant line and the refrigerant connection line through operation of the first and second expansion valves, respectively, and the first and second expansion valves may expand the refrigerant so that the expanded refrigerant is respectively supplied to the evaporator and the chiller.

The third expansion valve may expand the refrigerant supplied from the condenser to be introduced to the heat exchanger when the temperature of the vehicle interior is low, and when the temperature of the vehicle interior is high, the refrigerant supplied from the condenser may be introduced to the heat exchanger without the expanded state.

When cooling the electrical component and the battery module by using the coolant, the first branch line may be closed through an operation of the first valve, the coolant cooled in the radiator and stored in the reservoir tank may be supplied to the electrical component through an operation of the first water pump, and the coolant stored in the reservoir tank may be supplied to the battery module while circulating through the battery coolant line connected to the coolant line through an operation of the second valve.

When using the waste heat of the electrical equipment in the heating mode of the vehicle without the operation of the air conditioner, the first branch line may be opened through an operation of the first valve, in the cooling apparatus, on the basis of the first branch line, the coolant line connected to the radiator may be closed, the battery coolant line may be not connected to the coolant line through an operation of the second valve, the battery cooling apparatus and the air conditioner may be stopped, the coolant whose temperature is increased while passing through the electrical component by an operation of the first water pump may be supplied to the heater along the heating line connected through the third valve without passing through the radiator, and the coolant discharged from the heater may circulate along the heating line, the third valve, the coolant line, and the first branch line.

The first valve may open the coolant line connected to the radiator to allow some of the coolant passing through the electrical component to flow into the first branch line and the remaining coolant to flow into the radiator when the electrical component is overheated.

As described above, according to the heat pump system for the vehicle according to an exemplary embodiment of the present invention, the temperature of the battery module may be adjusted depending on the mode of the vehicle by using one chiller for performing heat exchange between the coolant and the refrigerant, and the interior of the vehicle may be heated by using the coolant, thereby simplifying the entire system.

According to embodiments of the present invention, it is also possible to improve the heating efficiency by recovering waste heat from the electrical component and using it for interior heating.

In addition, according to embodiments of the present invention, it is possible to optimize the performance of the battery module by efficiently controlling the temperature of the battery module, and increase an overall travel distance of the vehicle through efficient management of the battery module.

In addition, according to embodiments of the present invention, the coolant heater applied to the heating apparatus can be used to warm up the battery module or to assist in an interior heating of the vehicle, thereby reducing the cost and weight.

In addition, according to an exemplary embodiment of the present invention, heat of outside air, and waste heat of an electrical component, and a battery module is selectively used in a heating mode of the vehicle, thereby enhancing heating efficiency.

Further, an exemplary embodiment of the present invention may improve the cooling performance and reduce power consumption of a compressor by increasing condensation or evaporation performance of the refrigerant using a condenser and a heat exchanger.

In addition, through the simplification of the entire system, a reduction in production cost and weight is possible, and space utilization may be improved.

DETAILED DESCRIPTION OF ILLUSTRATIVE EMBODIMENTS

Figure 1:
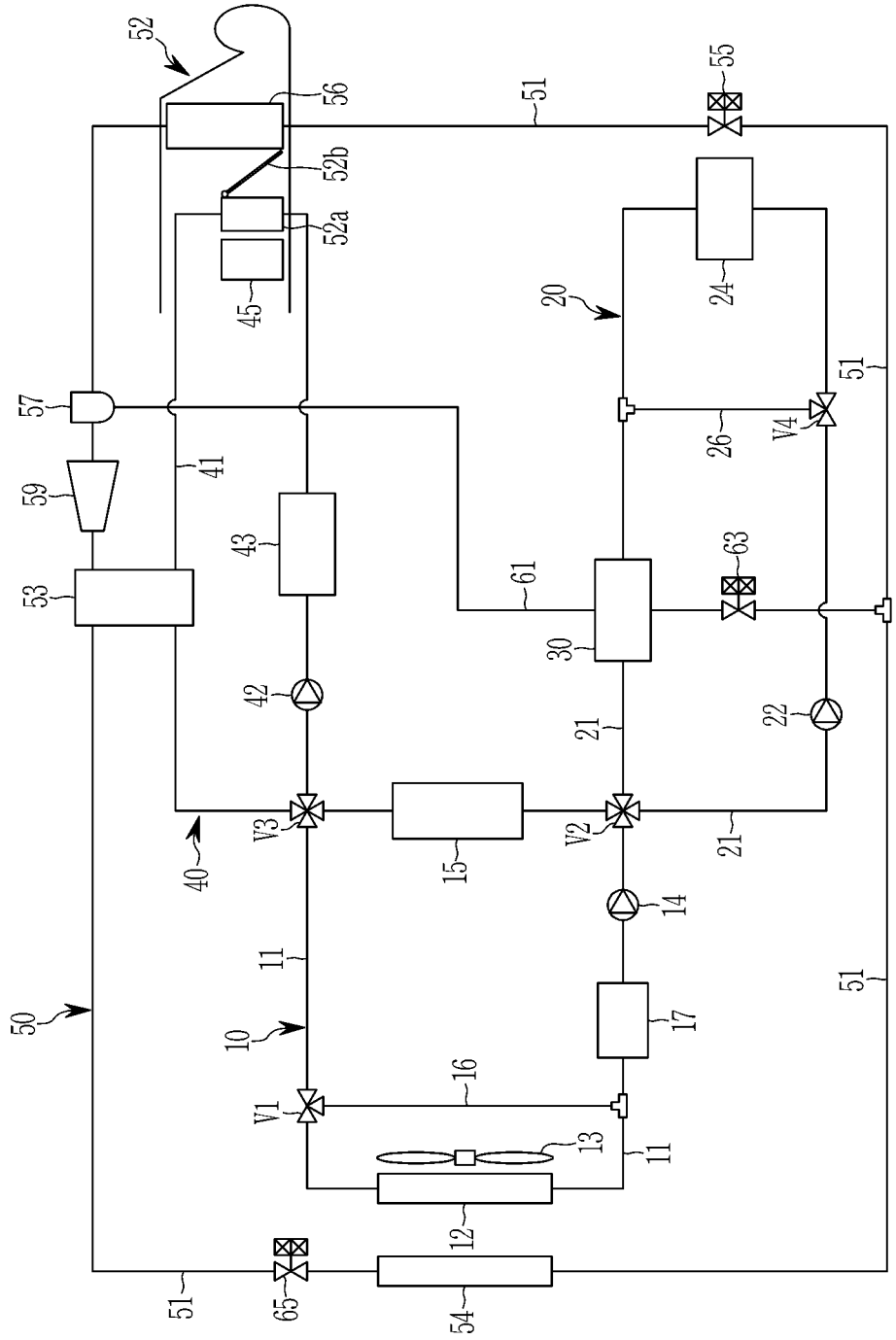
FIG. 1 illustrates a block diagram of a heat pump system for a vehicle according to an exemplary embodiment of the present invention.

An exemplary embodiment of the present invention will hereinafter be described in detail with reference to the accompanying drawings.

Exemplary embodiments disclosed in the present specification and the constructions depicted in the drawings are only the preferred embodiments of the present invention, and do not cover the entire scope of the present invention. Therefore, it will be understood that there may be various equivalents and variations at the time of the application of this specification.

In order to clarify the embodiments of the present invention, parts that are not connected to the description will be omitted, and the same elements or equivalents are referred to with the same reference numerals throughout the specification.

Also, the size and thickness of each element are arbitrarily shown in the drawings, but the present invention is not necessarily limited thereto, and in the drawings, the thickness of layers, films, panels, regions, etc., are exaggerated for clarity.

In addition, unless explicitly described to the contrary, the word "comprise" and variations such as "comprises" or "comprising" will be understood to imply the inclusion of stated elements but not the exclusion of any other elements.

Furthermore, each of terms, such as " . . . unit", " . . . means", " . . . part", and " . . . member" described in the specification, mean a unit of a comprehensive element that performs at least one function or operation.

FIG. 1 illustrates a block diagram of a heat pump system for a vehicle according to an exemplary embodiment of the present invention.

The heat pump system for the vehicle according to an exemplary embodiment of the present invention may adjust a temperature of a battery module 24 by using one chiller 30 in which a refrigerant and a coolant are heat-exchanged, and uses waste heat of an electrical component 15 and the battery module 24, thereby improving heating efficiency.

Here, in the heat pump system for the electric vehicle, a cooling apparatus 10 for cooling the electrical component 15, a battery cooling apparatus 20 for cooling the battery module 24, a heating apparatus 40 for heating an interior by using a coolant, and an air conditioner 50 that is an air conditioning apparatus for cooling the interior may be mutually interconnected.

That is, referring to FIG. 1, the heat pump system includes the cooling apparatus 10, the battery cooling apparatus 20, the chiller 30, and the heating apparatus 40.

First, the cooling apparatus 10 includes a radiator 12 connected to a coolant line 11, a first water pump 14, a first valve V1, and a reservoir tank 17.

The first radiator 12 is disposed forward in a vehicle, and a cooling fan 13 is provided at a rear of the first radiator 12 to cool the coolant through heat-exchange with an ambient air, e.g., by the operation of the cooling fan 13.

In addition, the electrical component 15 may include an electric power control unit (EPCU), a motor, an inverter, or an on board charger (OBC).

The electrical component 15 configured as described above may be provided in the coolant line 11 to be cooled in a water-cooled manner.

Accordingly, when the waste heat of the electrical component 15 is recovered in the heating mode of the vehicle, the heat generated from the EPCU, the motor, the inverter, or the OBC may be recovered.

In addition, the reservoir tank 17 is provided in the coolant line 11 between the radiator 12 and the first water pump 14. The first reservoir tank 17 may store a coolant cooled at the radiator 12.

The cooling apparatus 10 may circulate the coolant in the coolant line 11 by the operation of the first water pump 14 such that the coolant is supplied to the electrical component 15 provided in the coolant line 11.

Here, the cooling apparatus 10 may be provided with a first branch line 16. A first end of the first branch line 16 may be connected to the first valve V1, and a second end of the first branch line 16 may be connected to the coolant line 11 between the radiator 12 and the first water pump 14.

Accordingly, when the first branch line 16 is opened by the operation of the first valve V1 in the heating mode of the vehicle, the first branch line 15 again circulates the coolant passing through the electrical component 15 to the electrical component 15 without passing through the radiator 12, thereby raising the temperature of the coolant.

In this case, if the heating mode of the vehicle is performed, in the state that the coolant line 11 connected to the first branch line 16 and the electrical component 15 are connected to each other, the first valve V1 may close the coolant line 11 connected to the radiator 12 so as to stop the inflow of the coolant to the radiator 12.

The battery cooling apparatus 20 includes a battery coolant line 21 connected to the coolant line 11 through a second valve V2 and a second water pump 22 connected to the battery coolant line 21, and the battery module 24.

The battery cooling apparatus 20 may selectively circulate the coolant in the battery module 24 through an operation of the second water pump 22.

Meanwhile, the battery module 24 may be formed as a water-cooled type that supplies power to the electrical component 15, and is cooled by a coolant flowing along the battery coolant line 21.

In the present exemplary embodiment, the chiller 30 is provided in the battery coolant line 21 between the second valve V2 and the battery module 24.

The chiller 30 is connected to a refrigerant line 51 of an air conditioner 50 through a refrigerant connection line 61. That is, the chiller 30 may be a water-cooled heat exchanger into which a coolant flows.

Accordingly, the chiller 30 may regulate the temperature of the coolant by performing heat exchange between the coolant that circulates the battery coolant line 21 and the refrigerant that is selectively supplied from the air conditioner 50.

Also, the heating apparatus 40 may include a heating line 41 connected to the coolant line 11 through a third valve V3, and a third water pump 42 and a heater 52a provided in the heating line 41 so as to supply the coolant having the temperature that is increased while it passes through the electrical component 15 thereto.

The heater 52a may be provided inside an HVAC module 52 included in the air conditioner 50.

Here, a coolant heater 43 to selectively heat the coolant circulating in the heating line 41 may be provided in the heating line 41 between the third water pump 42 and the heater sea.

The coolant heater 43 is ON-operated when the temperature of the coolant supplied to the heater 52a in the heating mode of the vehicle is lower than a target temperature to heat the coolant circulated in the heating line 41, thereby inflowing the coolant of which the temperature is increased to the heater 52a.

The coolant heater 43 may be an electric heater that operates according to the power supply.

On the other hand, in the present exemplary embodiment, it is described that the coolant heater 43 is provided in the heating line 41, however it is not limited thereto, and an air heater 45 to increase the temperature of the outside air inflowing to the interior of the vehicle may be applied instead of the coolant heater 43.

The air heater 45 may be disposed on the rear of the heater 52a toward the interior of the vehicle inside the HVAC module 52 to selectively heat the outside air passing through the heater 52a.

That is, the heating apparatus 40 may be applied to one of the coolant heater 43 and the air heater 45.

The heating apparatus 40 constructed as described above supplies the high temperature coolant introduced from the cooling apparatus 10 to the heating line 41 in the heating mode of the vehicle or the coolant of which the temperature is increased while circulating through the heating line 41 to the heater 52a through the operation of the third water pump 42, thereby heating the vehicle interior.

Here, the first, second, and third water pumps 14, 22, and 42 may be electric water pumps.

On the other hand, in the present exemplary embodiment, the battery cooling apparatus 20 further includes a fourth valve V4 and a second branch line 26 which are provided between the second water pump 22 and the battery module 24.

A first end of the second branch line 26 is connected to the fourth valve V4. A second end of the second branch line 26 may be connected to the battery coolant line 21 which connects the battery module 24 and the chiller 30.

When a waste heat of the battery module 24 is not recovered to maintain the temperature of the battery module 24, the second branch line 26 may be selectively opened by the operation of the fourth valve V4 such that the coolant is not supplied to the battery module 24.

Accordingly, when the second branch line 26 is opened, the fourth valve V4 may close the battery coolant line 21 connected to the battery module 24.

Then, in the battery cooling apparatus 20, the coolant may circulate along the opened battery coolant line 21 and the opened second branch line 26 by the operation of the second water pump 22 without passing through the battery module 24.

In the present exemplary embodiment, the air conditioner 50 includes a heating, ventilation, and air conditioning (HVAC) module 52, a condenser 53, a heat exchanger 54, a first expansion valve 55, an evaporator 56, and a compressor 59 which are connected through the refrigerant line 51.

First, the HVAC module 52 includes the evaporator 56 connected therewith through the refrigerant line 51, and an opening and closing door 52b for controlling the outside air passing through the evaporator 56 to be selectively introduced into the heater 52a depending on cooling, heating, and heating and dehumidification modes of the vehicle therein.

That is, the opening and closing door 52b is opened to allow the outside air passing through the evaporator 56 to be introduced into the heater 52a in the heating mode of the vehicle. In contrast, in the cooling mode of the vehicle, the opening and closing door 52b closes off the heater 52a such that the outside air that is cooled while passing through the evaporator 56 directly flows into the vehicle.

Here, when the coolant heater 43 is not provided in the heating apparatus 40, the air heater 45 provided in the HVAC module 52 may be provided at an opposite side of the evaporator 56 with the heater 52a interposed therebetween.

The air heater 45 may be operated to raise the temperature of the outside air passing through the heater 52a when the temperature of the coolant supplied to the heater 52a is lower than a target temperature for interior heating.

On the other hand, the air heater 45 may be provided inside the HVAC module 52 when the coolant heater 43 is not provided in the heating line 41.

That is, in the heat pump system according to embodiments of the present invention, only one of the coolant heater 43 and the air heater 45 may be applied.

In the present exemplary embodiment, the condenser 53 is connected with the refrigerant line 51 to allow the refrigerant to pass therethrough, and is connected to the heating line 41 to allow the coolant circulating through the heating apparatus 40 to pass therethrough.

This condenser 53 may condense the refrigerant through heat exchange with the coolant supplied through the heating line 41. In other words, the condenser 53 may be a water-cooled heat exchanger into which the coolant flows.

The condenser 53 configured as described above may perform heat exchange between the refrigerant supplied from the compressor 59 and the coolant supplied from the heating apparatus 40 so as to condense the refrigerant.

In the present exemplary embodiment, the heat exchanger 54 may be provided in the refrigerant line 51 between the condenser 53 and the evaporator 56.

The first expansion valve 55 is provided in the refrigerant line 51 between the heat exchanger 54 and the evaporator 56. The first expansion valve 55 receives the refrigerant passing through the heat exchanger 54 to expand it.

The accumulator 57 is provided in the refrigerant line 51 between the evaporator 56 and the compressor 59 and is connected to the refrigerant connection line 61.

Such an accumulator 57 improves the efficiency and durability of the compressor 59 by supplying only the gaseous refrigerant to the compressor 59.

In the present exemplary embodiment, the first end of the refrigerant connection line 61 is connected to the refrigerant line 51 between the heat exchanger 54 and the first expansion valve 55. The second end of the refrigerant connection line 61 may be connected to the accumulator 57.

Here, the accumulator 57 may supply the gas refrigerant of the refrigerant supplied through the refrigerant connection line 61 to the compressor 59.

On the other hand, the refrigerant connection line 61 is provided with a second expansion valve 63, and the refrigerant line 51 between the condenser 53 and the heat exchanger 54 may be provided with a third expansion valve 65.

The second expansion valve 63 may expand the coolant introduced through the refrigerant connection line 61 to inflow to the chiller 30 when cooling the battery module 24 with the refrigerant.

Here, the second expansion valve 63 is operated when recovering the waste heat of the electrical component 15, or the battery module 26, in the heating mode and heating and dehumidification mode of the vehicle.

The second expansion valve 63 may selectively expand the refrigerant introduced through the refrigerant connection line 61 to inflow the chiller 30.

That is, the second expansion valve 63 expands the refrigerant discharged from the heat exchanger 54 and flowing into the chiller 30 while lowering the temperature of the refrigerant. Thereby the temperature of the coolant may be further lowered.

As a result, the battery module 24 may be cooled more efficiently by inflowing the coolant having the lower temperature while passing through the chiller 30.

The third expansion valve 65 may selectively expand the coolant that is introduced to the heat exchanger 54 in the heating mode and the heating and dehumidification mode of the vehicle.

Here, the heat exchanger 54 may further condense or evaporate the refrigerant condensed from the condenser 53 through heat exchange with the outside air, depending on the selective operation of the third expansion valve 65.

In other words, the heat exchanger 54 is disposed in the front of the radiator 12 to mutually heat-exchange the coolant that has been introduced therein with the outside air.

Meanwhile, when the heat exchanger 54 condenses the refrigerant, the heat exchanger 54 may increase sub-cooling of the refrigerant by further condensing the refrigerant condensed at the condenser 53, thereby improving a COP (Coefficient of Performance), which is a coefficient of cooling capacity versus power required by the compressor.

The compressor 59 is connected via the refrigerant line 51 between the evaporator 56 and the condenser 53. This compressor 59 may compress the refrigerant in the gas state and supply the compressed refrigerant to the condenser 53.

The first, second and third expansion valves 55, 63, and 65 may be electronic expansion valves that selectively expand the refrigerant while controlling the flow of the refrigerant passing through the refrigerant line 51 or the refrigerant connection line 61.

Also, the first valve V1 may be a 3-way valve that may distribute the flow, and the second and third valves V2 and V3 may be 4-way valves.

Hereinafter, the operation and action of the heat pump system for the vehicle according to an exemplary embodiment of the present invention is described with reference to FIG. 2 to FIG. 8 in detail.

First, the operation of the heat pump system for the vehicle according to an exemplary embodiment of the present invention is described with reference to FIG. 2 when cooling the electrical component 15 and the battery module 24 by using the coolant.

Figure 2:
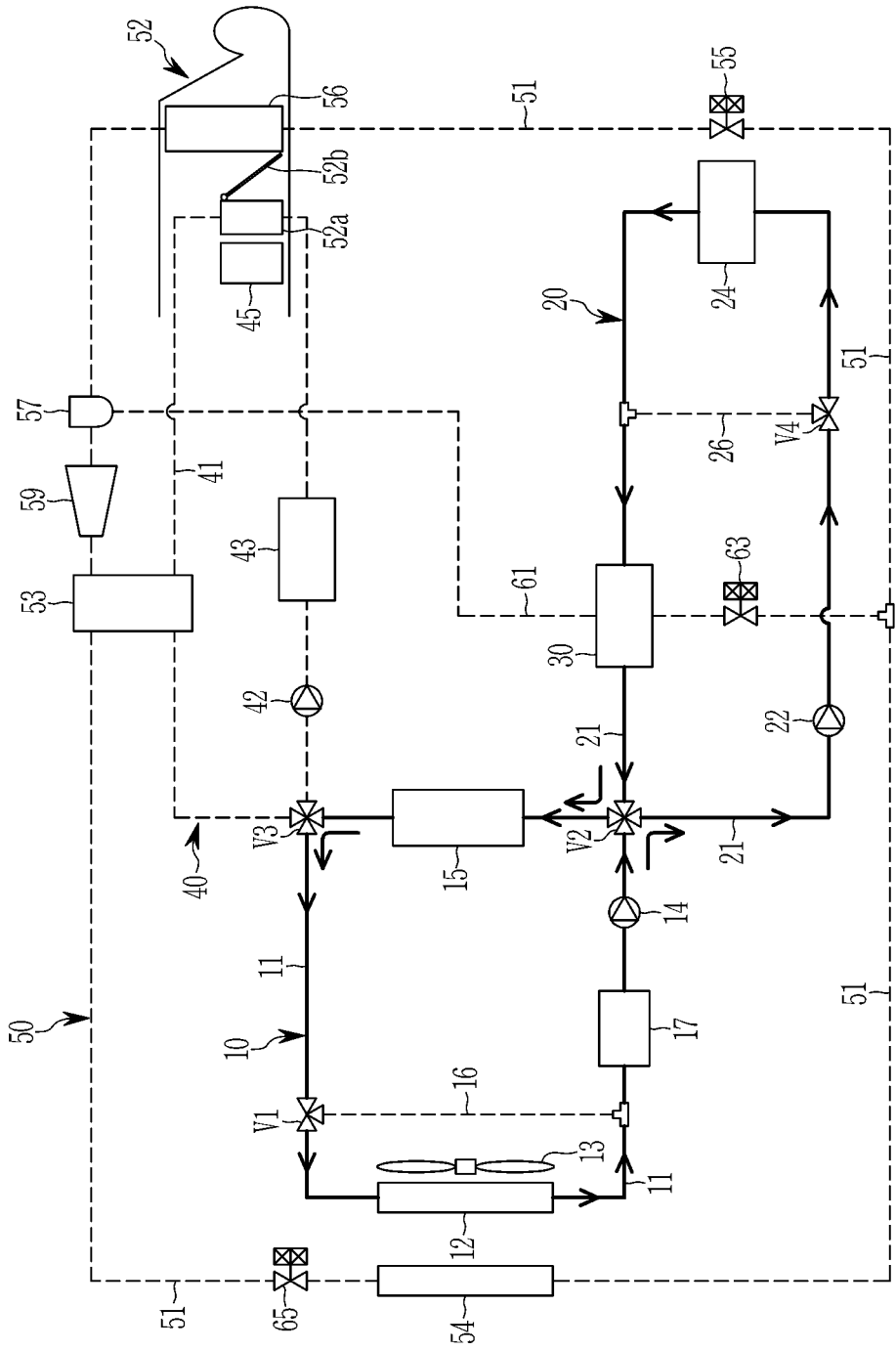
FIG. 2 illustrates an operational state diagram for cooling an electrical component and a battery module using a coolant in a heat pump system for a vehicle according to an exemplary embodiment of the present invention.

FIG. 2 illustrates an operational state diagram for cooling an electrical component and a battery module using a coolant in a heat pump system for a vehicle according to an exemplary embodiment of the present invention.

Referring to FIG. 2, the first branch line 16 is closed through the operation of the first valve V1.

In addition, the battery coolant line 21 is connected to the coolant line 11 through the operation of the second valve V2.

Accordingly, in the battery cooling apparatus 20, the coolant line 11 and the battery coolant line 21 are connected through the operation of the second valve V2, and the coolant supplied from the cooling apparatus 10 may be circulated.

In this state, in the cooling apparatus 10, the first water pump 14 is operated to cool the electrical component 15. In addition, in the battery cooling apparatus 20, the second water pump 22 is operated to cool the battery module 24.

Accordingly, the coolant cooled in the radiator 12 and stored in the reservoir tank 17 is supplied to the electrical component 15 after passing through the battery module 24 by the operation of the first and second water pumps 14 and 22.

That is, the coolant stored in the reservoir tank 17 is first supplied to the battery module 24 while circulating through the battery coolant line 21 connected to the coolant line 11 by the operation of the second valve V2.

Then, the coolant that has passed through the battery module 24 passes through the electrical component 15 and then flows into the radiator 12 again.

That is, the coolant cooled in the radiator 12 and stored in the reservoir tank 17 circulates through the coolant line 11 and the battery coolant line 21 by the operations of the first and second water pumps 14 and 22, respectively, to efficiently cool the electrical component 15 and the battery module 24.

The air conditioner 50 is not operated because the cooling mode of the vehicle is not activated.

On the other hand, although it has been described in the present exemplary embodiment that both of the electrical component 15 and the battery module 24 are cooled, the present invention is not limited thereto, and when one of the electrical component 15 and the battery module 24 is separately cooled, the first and second water pumps 14 and 22, and the second valve V2 may be selectively operated.

An operation of the case of cooling the battery module 24 in the cooling mode of the vehicle will be described with respect to FIG. 3.

Figure 3:
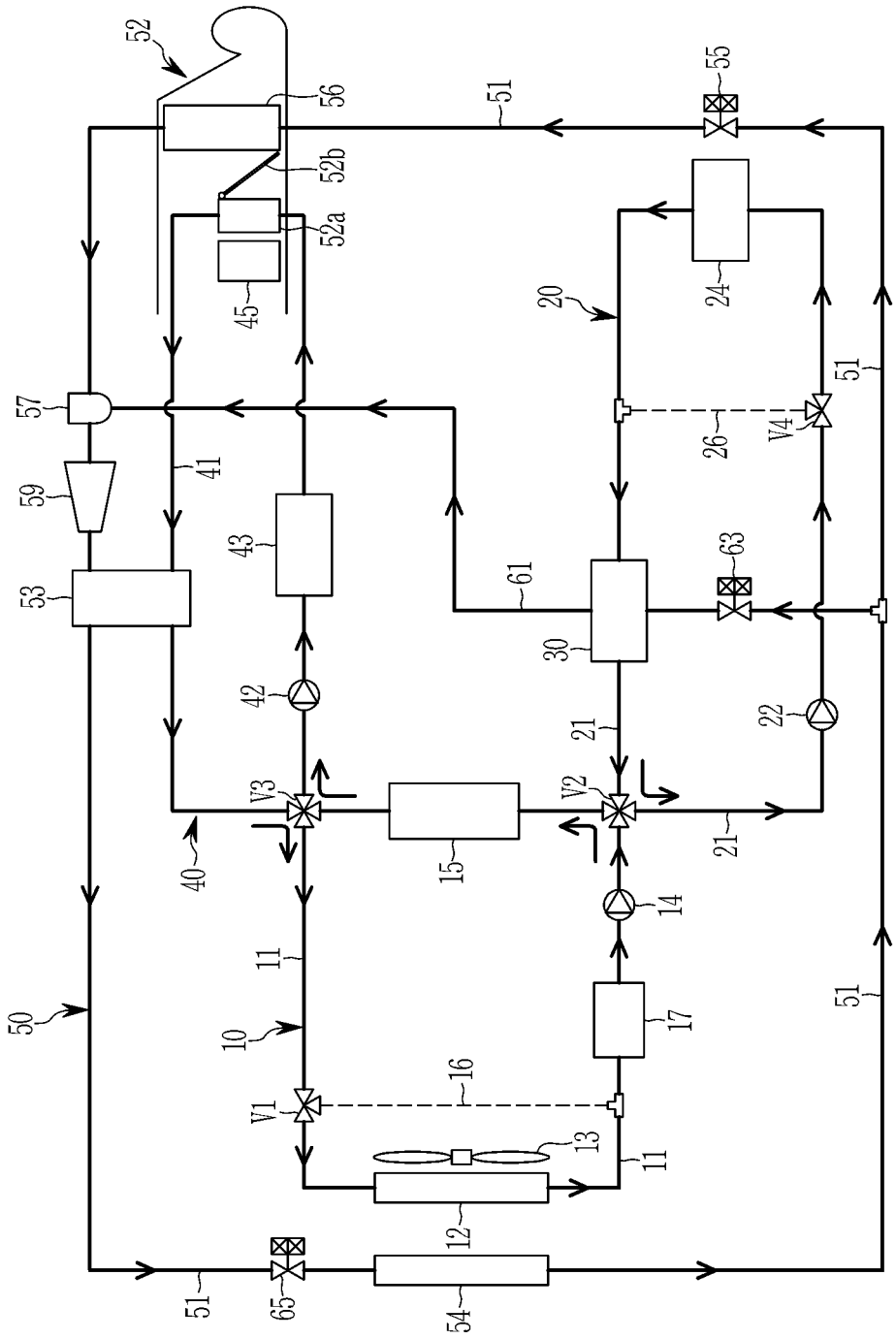
FIG. 3 illustrates an operational state diagram for cooling a battery module by using a refrigerant in a cooling mode of a vehicle in a heat pump system for a vehicle according to an exemplary embodiment of the present invention.

FIG. 3 illustrates an operational state diagram for cooling a battery module by using a refrigerant in a cooling mode of a vehicle in a heat pump system for a vehicle according to an exemplary embodiment of the present invention.

Referring to FIG. 3, in the cooling apparatus 10, the coolant is circulated in the coolant line 11 through the operation of the first water pump 14. Accordingly, the coolant cooled by the radiator 12 is circulated to the electrical component 15.

Herein, the first branch line 16 is closed by the operation of the first valve V1.

In the heating apparatus 40, the coolant line 11 and the heating line 41 are connected by the operation of the third valve V3 such that the coolant supplied from the cooling apparatus 11 is circulated.

Thus, the coolant cooled by the radiator 12 may be supplied to the condenser 53 through the operation of the first and third water pumps 14 and 42.

The coolant line 11 and the battery coolant line 21 form an independent closed circuit by the operation of the second valve V2, respectively.

Thus, in the battery cooling apparatus 20, the coolant which passes through the chiller 30 may be supplied to the battery module 24 along the battery coolant line 21 by the operation of the second water pump 22.

Herein, in the battery cooling apparatus 20, the second branch line 26 is closed by the operation of the fourth valve V4.

In the battery cooling apparatus 20, the coolant may be supplied to the battery module 24 and the chiller 30 while it circulates along the battery coolant line 21 by the operation of the second water pump 22.

That is, the battery cooling apparatus 20 may form a closed circuit in which the coolant is independently circulated along the battery coolant line 21 by the operation of the second valve V2.

In the air conditioner 50, each constituent element operates to cool the interior of the vehicle. Accordingly, the refrigerant is circulated along the refrigerant line 51.

Herein, the refrigerant line 51 connecting the heat exchanger 54 and the evaporator 56 is opened by the operation of the first expansion valve 55. The refrigerant connection line 61 is opened by the operation of the second expansion valve 63.

Then, the refrigerant having passed through the heat exchanger 54 may be circulated along the refrigerant line 51 and the refrigerant connection line 61.

Herein, the first and second expansion valves 55 and 63 may expand the refrigerant such that the expanded refrigerant is supplied to the evaporator 56 and the chiller 40, respectively. The third expansion valve 65 may inflow the refrigerant supplied from the condenser 53 to the heat exchanger 54 without expanding.

Meanwhile, the heating apparatus 40 supplies the coolant supplied from the cooling apparatus 10 to the condenser 53 through the operation of the third water pump 42.

Accordingly, the condenser 53 condenses the coolant using the coolant flowing along the heating line 41. Also, the heat exchanger 54 may additionally condense the refrigerant introduced from the condenser 53 by the operation of the third expansion valve 65 through heat exchange with the outside air.

The coolant that has passed through the chiller 30 is circulated along the battery coolant line 21 by the operation of the second water pump 22 such that the battery module 24 is cooled.

The coolant passing through the chiller 30 is cooled through heat exchange with the expanded refrigerant that is supplied to the chiller 30. The coolant cooled in the chiller 30 is supplied to the battery module 24. Accordingly, the battery module 24 is cooled by the cooled coolant.

That is, the second expansion valve 63 expands some of the coolant through the sub-condenser 54 to supply the expanded refrigerant to the chiller 30, and opens the refrigerant connection line 61.

Accordingly, the refrigerant discharged from the heat exchanger 54 is expanded to enter a low-temperature and low-pressure state through the operation of the second expansion valve 63, and flows into the chiller 30 connected to the refrigerant connection line 61.

Then the refrigerant introduced to the chiller 30 is heat-exchanged with the coolant and then inflows to the compressor 59 after passing through the accumulator 57 through the refrigerant connection line 61.

In other words, the coolant with the increased temperature from cooling the battery module 24 is cooled through heat exchange inside the chiller 30 with the low temperature low pressure refrigerant. The cooled coolant is again supplied to the battery module 24 along the battery coolant line 21.

That is, the coolant circulated in the battery cooling apparatus 20 may efficiently cool the battery module 24 while repeating the above-described operation.

Meanwhile, the remaining coolant exhausted from the heat exchanger 54 flows through the refrigerant line 51 to cool the interior of the vehicle, and sequentially passes through the first expansion valve 55, the evaporator 56, the compressor 59, and the condenser 53.

Here, the outside air that is introduced to the HVAC module 52 is cooled by the low temperature refrigerant introduced to the evaporator 56 while passing through the evaporator 56.

At this time, the opening/closing door 52b reduces a portion of the cooled outside air passing through the heater 52a so as to not pass through the heater sea. Thus, the cooled outside air can be directly directed into the interior of the vehicle, thereby cooling the interior of the vehicle.

On the other hand, in the evaporator 56, the refrigerant of which the condensed amount is increased while sequentially passing through the condenser 53 and the heat exchanger 54 is expanded and supplied, thereby evaporating the refrigerant with the further lower temperature.

That is, in the present exemplary embodiment, the condenser 53 condenses the refrigerant, and the heat exchanger 54 further condenses the refrigerant, thereby favoring the subcooling formation of the refrigerant.

As the subcooled refrigerant evaporates with the lower temperature in the evaporator 56, the temperature of the coolant that is heat exchanged at the evaporator 56 may be further reduced, thereby improving cooling performance and efficiency.

While repeating the above-described process, the refrigerant may cool the interior of the vehicle in the cooling mode and simultaneously cool the coolant through the heat exchange while passing through the chiller 30.

The coolant of a low temperature cooled by the chiller 30 inflows to the battery module 24. Accordingly, the battery module 24 may be efficiently cooled by the supplied low temperature coolant.

In the present exemplary embodiment, the operation for the case of recovering the waste heat of the external heat source, the electrical component 15, and the battery module 24 in a heating mode of the vehicle is described with reference to FIG. 4.

Figure 4:
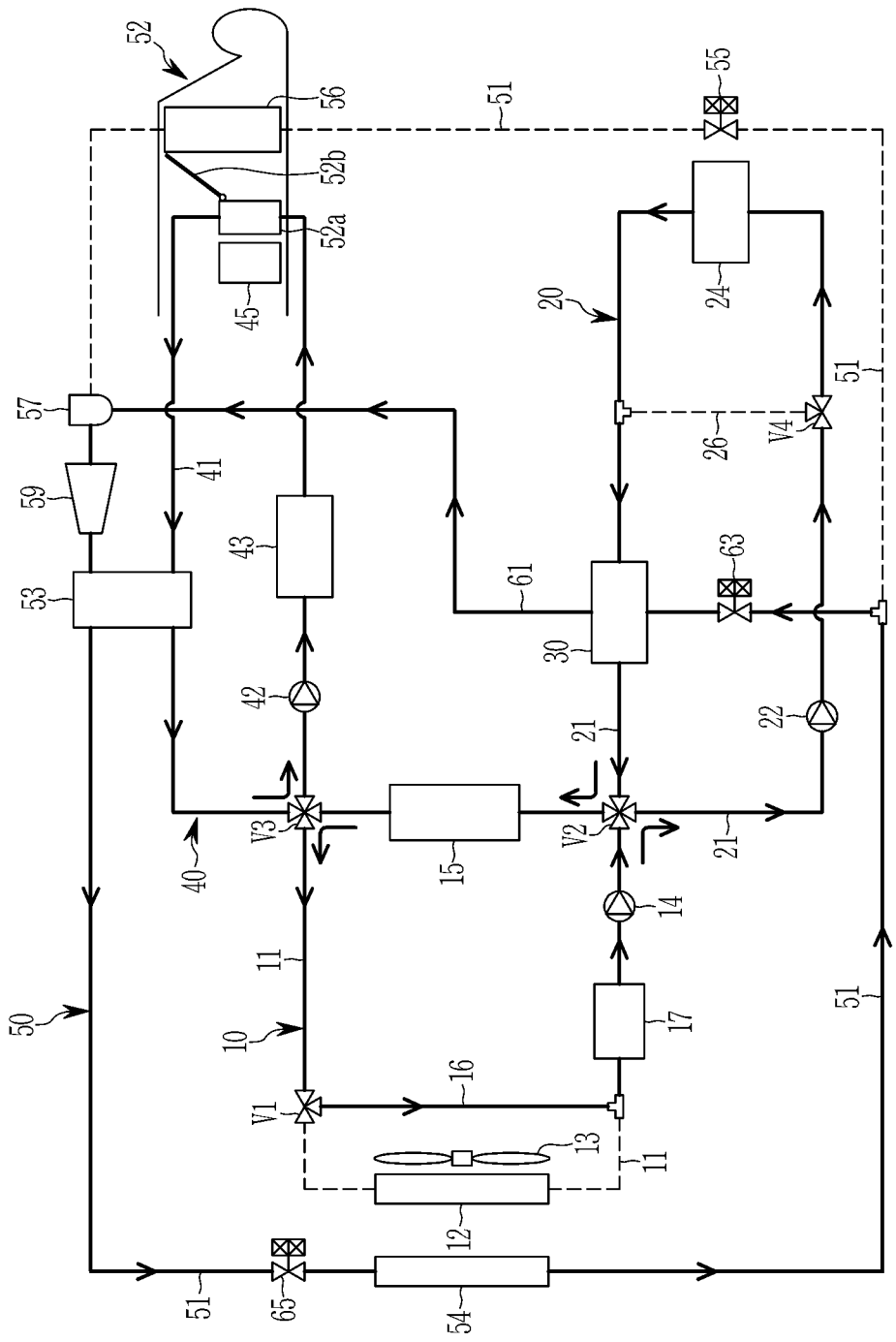
FIG. 4 illustrates an operational state diagram for waste heat recovery of external heat, an electrical component, and a battery module depending on a heating mode in a heat pump system for a vehicle according to an exemplary embodiment of the present invention.

FIG. 4 illustrates an operational state diagram for waste heat recovery of external heat, an electrical component, and a battery module depending on a heating mode in a heat pump system for a vehicle according to an exemplary embodiment of the present invention.

Referring to FIG. 4, the heat pump system may absorb the external heat from the outside air along with the waste heat of the electrical component 15 and the battery module 24 in an initial starting idle state IDLE of the vehicle or during an initial driving state where the waste heat of the electrical component 15 is insufficient.

First, in the cooling apparatus 10, the first water pump 14 is operated for circulation of the coolant.

Herein, the first branch line 16 is opened by the operation of the first valve V1.

At the same time, in the cooling apparatus 10, on the basis of the first branch line 16, a portion of the coolant line 11 connected to the radiator 12 and a portion of the coolant line 11 connecting the radiator 12 and the reservoir tank 17 are closed through the operation of the first valve V1.

In this state, the coolant passing through the electrical component 15 may be circulated along the opened first branch line 16 and the coolant line 11 without passage through the radiator 12 through the operation of the first water pump 14.

Meanwhile, in the battery cooling apparatus 20, the coolant line 11 and the battery coolant line 21 are connected by the operation of the second valve V2.

Herein, the second branch line 26 is closed by the operation of the fourth valve V4.

Accordingly, the coolant passing through the electrical component 15 is flowed into the battery coolant line 21. The coolant flowing from the coolant line 11 to the battery coolant line 21 may be supplied to the chiller 30 along the battery coolant line 21 after passing through the battery module 24 by the operation of the second water pump 22.

That is, the coolant passing through the electrical component 15 and the battery module 24 may continuously circulate along the coolant line 11, the first branch line 16, and the battery coolant line 21 without passing through the radiator 12.

Accordingly, the temperature of the coolant is increased by absorbing the waste heat from the electrical component 15 and the battery module 24.

The coolant with the increased temperature may be supplied to the chiller 30 provided at the battery coolant line 21. That is, the waste heat generated by the electrical component 15 and the battery module 24 raises the temperature of the coolant circulating through the coolant line 11 and the battery coolant line 21, respectively.

In the heating apparatus 40, the coolant circulates along the heating line 41 through the operation of the third water pump 42.

The coolant line 11 and the heating line 41 may form the independent closed circuit through the operation of the third valve V3.

Thus, the coolant circulating through the heating line 41 may be supplied to the condenser 53 after passing through the heater 52a through the operation of the third water pump 42.

Here, the coolant heater 43 is operated when the temperature of the coolant circulating along the heating line 41 is lower than the target temperature, so that the coolant circulating in the heating line 41 may be heated.

On the other hand, when the air heater 45 is applied instead of the coolant heater 43, the air heater 45 operates when the temperature of the outside air passing through the heater 52a is lower than the target temperature, and the outside air introduced to the interior of the vehicle may be heated.

In the air conditioner 50, each constituent element operates to heat the vehicle interior. Thus, the refrigerant is circulated along the refrigerant line 51.

Here, the refrigerant line 51 connecting the condenser 53 and the evaporator 56 is closed through the operation of the first expansion valve 55.

The refrigerant connection line 61 is opened through operation of the second expansion valve 63.

Here, the second expansion valve 63 may supply the refrigerant to the chiller 30 by expanding the refrigerant supplied from the heat exchanger 54 to the refrigerant connection line 61.

The third expansion valve 65 may also supply the refrigerant to the heat exchanger 54 by expanding the refrigerant supplied from the condenser 53.

Thus, the heat exchanger 54 recovers the external heat while evaporating the expanded refrigerant through heat exchange with the outside air.

The coolant, which absorbs the waste heat of the electrical component 15 and the battery module 24 and is increased in temperature, is recovered by increasing the temperature of the refrigerant supplied to the chiller 30 while passing through the chiller 30 through the operation of the first and second water pumps 14 and 22.

That is, the chiller 30 receives the refrigerant supplied from the heat exchanger 54 and expanded through the operation of the second expansion valve 63 through the refrigerant connection line 61, and evaporates the supplied refrigerant through heat exchange with the coolant of which the temperature is increased while passing through the electrical component 15 and the battery module 24, respectively, thereby recovering the waste heat of the electrical component 15 and the battery module 24.

Next, the refrigerant passing through the chiller 30 is supplied to the accumulator 57 along the refrigerant connection line 61.

The refrigerant supplied to the accumulator 57 is separated into gas and liquid. Of the refrigerant separated by gas and liquid, the gas refrigerant is supplied to the compressor 59.

The refrigerant compressed with the high temperature high pressure from the compressor 59 inflows to the condenser 53.

Here, the refrigerant supplied to the condenser 53 may increase the temperature of the coolant by exchanging heat with the coolant circulating through the heating line 41. The coolant with raised temperature is supplied to the heater 52a.

Meanwhile, the opening/closing door 52b is opened so that the outside air introduced to the HVAC module 52 and passing through the evaporator 56 passes through the heater sea.

As a result, the outside air introduced from the outside flows into the interior in an uncooled temperature state when passing through the evaporator 56, which is not supplied with the refrigerant. The introduced outside air is converted to a high temperature state while passing through the heater 52a to be introduced into the interior of the vehicle, thereby realizing the heating of the interior of the vehicle.

That is, the heat pump system according to the present exemplary embodiment absorbs the external heat from the heat exchanger 54 when the cooling is required in the initial starting idle state (IDLE) of the vehicle or during the initial driving state and is used to increase the temperature of the refrigerant by using the waste heat of the electrical component 15 and the battery module 24, thereby reducing the power consumption of the compressor 59 and improving the cooling efficiency.

In the present exemplary embodiment, the operation for the case of recovering the waste heat of the external heat source, and the electrical component 15 in the heating mode of the vehicle is described with reference to FIG. 5.

Figure 5:
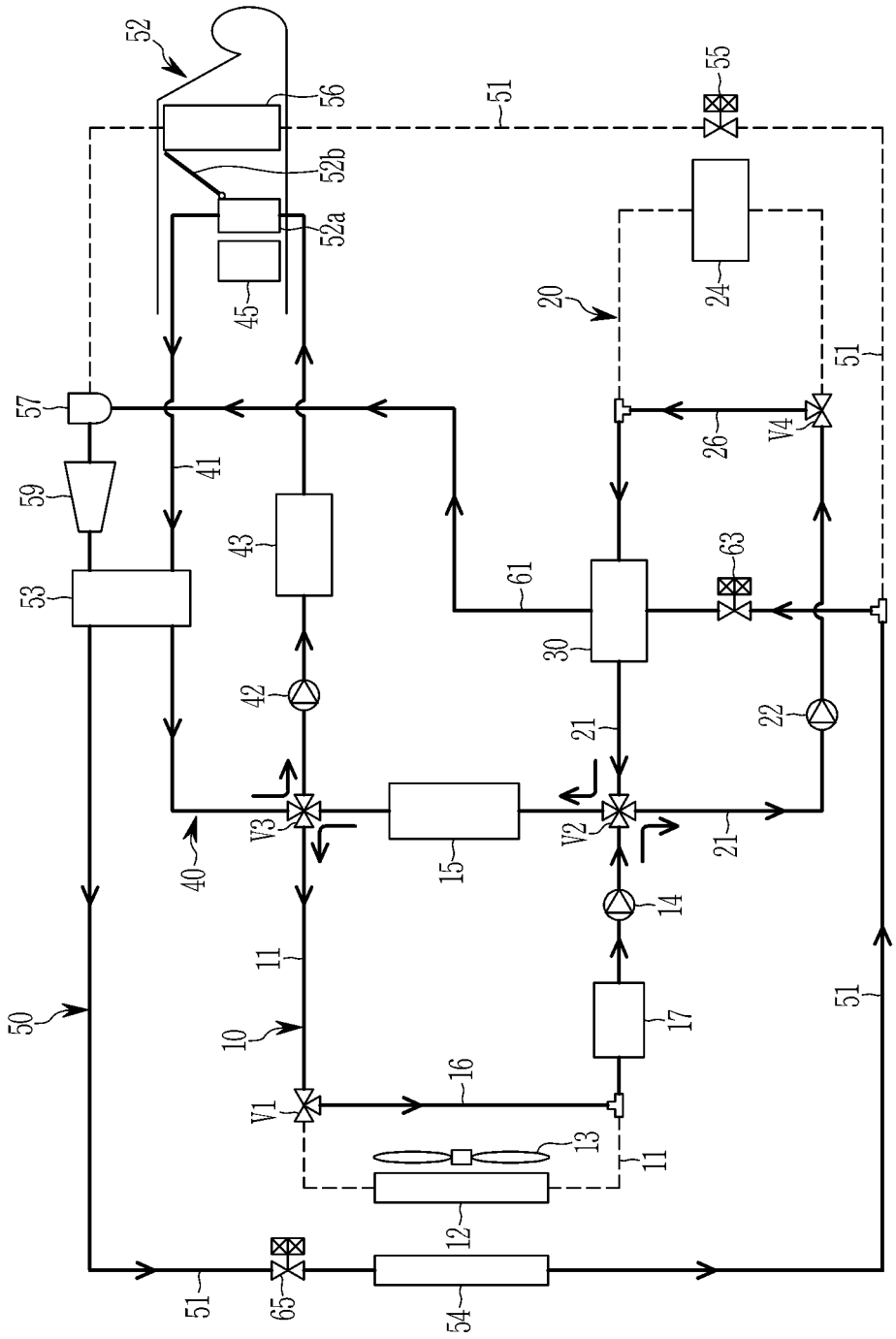
FIG. 5 illustrates an operational state diagram for waste heat recovery of external heat and an electrical component depending on a heating mode in a heat pump system for a vehicle according to an exemplary embodiment of the present invention.

FIG. 5 illustrates an operational state diagram for waste heat recovery of external heat and an electrical component depending on a heating mode in a heat pump system for a vehicle according to an exemplary embodiment of the present invention.

Referring to FIG. 5, the heat pump system may absorb the external heat from the outside air along with the waste heat of the electrical component 15 in an initial starting idle state IDLE of the vehicle or during an initial driving state where the waste heat of the electrical component 15 is insufficient.

First, in the cooling apparatus 10, the first water pump 14 is operated for circulation of the coolant.

Herein, the first branch line 16 is opened by the operation of the first valve V1.

At the same time, in the cooling apparatus 10, on the basis of the first branch line 16, a portion of the coolant line 11 connected to the radiator 12 and a portion of the coolant line 11 connecting the radiator 12 and the reservoir tank 17 are closed through the operation of the first valve V1.

In this state, the coolant passing through the electrical component 15 may be supplied to the chiller 30 along the opened first branch line 16 and the coolant line 11 without passage through the radiator 12 through the operation of the first water pump 14.

Meanwhile, in the battery cooling apparatus 20, the coolant line 11 and the battery coolant line 21 are connected by the operation of the second valve V2.

Thus, the coolant passing through the electrical component 15 is flowed into the battery coolant line 21.

Herein, the second branch line 26 is opened by the operation of the fourth valve V4. In this state, based on the second branch line 26, the battery coolant line 21 connected to the battery module 24 is closed.

Accordingly, the battery coolant line 21 connected to the chiller 30 is opened through the second branch line 26.

Therefore, the coolant of which the temperature has increased while passing through the electrical component 15 is circulated along the battery coolant line 21 and the second branch line 26 by the operation of the second water pump 22, and may be supplied to the chiller 30.

That is, the coolant passing through the electrical component 15 may continuously circulate along the coolant line 11, the battery coolant line 21, and the second branch line 26 without passing through the radiator 12. Accordingly, the temperature of the coolant is increased by absorbing the waste heat from the electrical component 15.

The coolant with the increased temperature may be supplied to the chiller 30 provided at the battery coolant line 21. That is, the waste heat generated by the electrical component 15 raises the temperature of the coolant circulating through the coolant line 11 and the battery coolant line 21, respectively.

In the heating apparatus 40, the coolant circulates along the heating line 41 through the operation of the third water pump 42.

The coolant line 11 and the heating line 41 may form the independent closed circuit through the operation of the third valve V3.

Thus, the coolant circulating through the heating line 41 may be supplied to the condenser 53 after passing through the heater 52a through the operation of the third water pump 42.

Here, the coolant heater 43 is operated when the temperature of the coolant circulating along the heating line 41 is lower than the target temperature, so that the coolant circulating in the heating line 41 may be heated.

On the other hand, when the air heater 45 is applied instead of the coolant heater 43, the air heater 45 operates when the temperature of the outside air passing through the heater 52a is lower than the target temperature, and the outside air introduced to the interior of the vehicle may be heated.

In the air conditioner 50, each constituent element operates to heat the vehicle interior. Thus, the refrigerant is circulated along the refrigerant line 51.

Here, the refrigerant line 51 connecting the condenser 53 and the evaporator 56 is closed through the operation of the first expansion valve 55.

The refrigerant connection line 61 is opened through operation of the second expansion valve 63.

Here, the second expansion valve 63 may supply the refrigerant to the chiller 30 by expanding the refrigerant supplied from the heat exchanger 54 to the refrigerant connection line 61.

The third expansion valve 65 may also supply the refrigerant to the heat exchanger 54 by expanding the refrigerant supplied from the condenser 53.

Thus, the heat exchanger 54 recovers the external heat while evaporating the expanded refrigerant through heat exchange with the outside air.

The coolant, which absorbs the waste heat of the electrical component 15 and is increased in temperature, is recovered by increasing the temperature of the refrigerant supplied to the chiller 30 while passing through the chiller 30 through the operation of the first and second water pumps 14 and 22.

That is, the chiller 30 receives the refrigerant supplied from the heat exchanger 54 and expanded through the operation of the second expansion valve 63 through the refrigerant connection line 61, and evaporates the supplied refrigerant through heat exchange with the coolant of which the temperature is increased while passing through the electrical component 15, thereby recovering the waste heat of the electrical component 15 and the battery module 24.

Next, the refrigerant passing through the chiller 30 is supplied to the accumulator 57 along the refrigerant connection line 61.

The refrigerant supplied to the accumulator 57 is separated into gas and liquid. Of the refrigerant separated by gas and liquid, the gas refrigerant is supplied to the compressor 59.

The refrigerant compressed with the high temperature high pressure from the compressor 59 inflows to the condenser 53.

Here, the refrigerant supplied to the condenser 53 may increase the temperature of the coolant by exchanging heat with the coolant circulating through the heating line 41. The coolant with raised temperature is supplied to the heater sea.

Meanwhile, the opening/closing door 52b is opened so that the outside air introduced to the HVAC module 52 and passing through the evaporator 56 passes through the heater sea.

As a result, the outside air introduced from the outside flows into the interior in an uncooled temperature state when passing through the evaporator 56, which is not supplied with the refrigerant. The introduced outside air is converted to a high temperature state while passing through the heater 52a to be introduced into the interior of the vehicle, thereby realizing the heating of the interior of the vehicle.

That is, the heat pump system according to the present exemplary embodiment absorbs the external heat from the heat exchanger 54 when the cooling is required in the initial starting idle state (IDLE) of the vehicle or during the initial driving state and is used to increase the temperature of the refrigerant by using the waste heat of the electrical component 15, thereby reducing the power consumption of the compressor 59 and improving the cooling efficiency.

In the present exemplary embodiment, the operation for the case of recovering the waste heat of the electrical component 15 depending on the heating/dehumidification mode of the vehicle is described with reference to FIG. 6.

Figure 6:
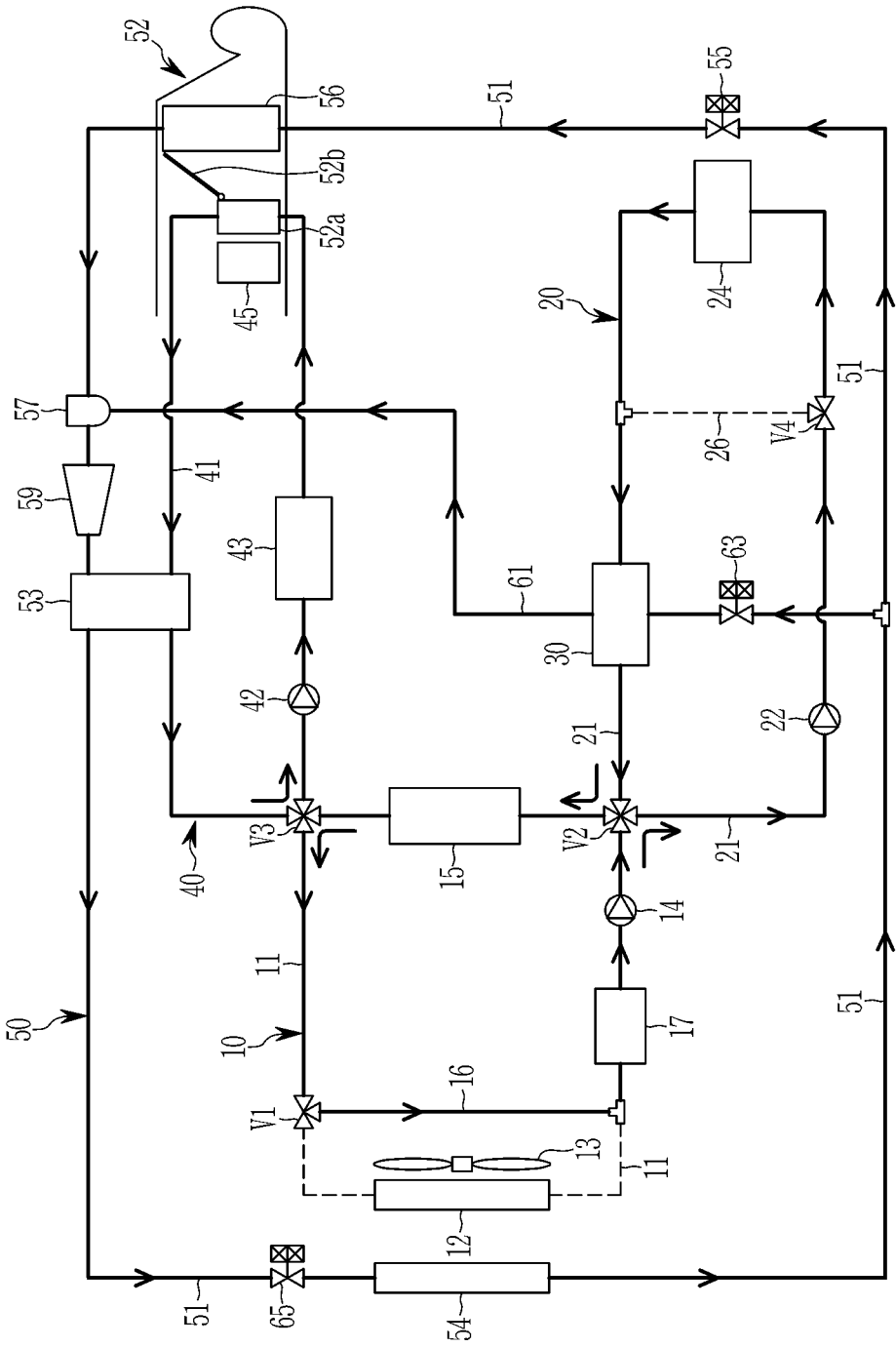
FIG. 6 illustrates an operational state diagram for a heating and dehumidification mode in a heat pump system for a vehicle according to an exemplary embodiment of the present invention.

FIG. 6 illustrates an operational state diagram for a heating and dehumidification mode in a heat pump system for a vehicle according to an exemplary embodiment of the present invention.

Referring to FIG. 6, the heat pump system may recover the waste heat of the electrical component 15 and the battery module 24 in the heating and dehumidification mode of the vehicle to use the interior heating.

Here, when the temperature of the vehicle interior is a low temperature, the heat pump system may recover the external heat along with the waste heat of the electrical component 15 and the battery module 24. Whereas, when the temperature of the vehicle interior is a high temperature, it may only recover the waste heat of the electrical component 15 and the battery module 24 to use in the interior heating of the vehicle.

First, in the cooling apparatus 10, the first water pump 14 is operated for circulation of the coolant.

Herein, the first branch line 16 is opened by the operation of the first valve V1.

At the same time, in the cooling apparatus 10, on the basis of the first branch line 16, a portion of the coolant line 11 connected to the radiator 12 and a portion of the coolant line 11 connecting the radiator 12 and the reservoir tank 17 are closed through the operation of the first valve V1.

In this state, the coolant passing through the electrical component 15 may be supplied to the chiller 30 along the opened first branch line 16 and the coolant line 11 without passage through the radiator 12 through the operation of the first water pump 14.

Meanwhile, in the battery cooling apparatus 20, the coolant line 11 and the battery coolant line 21 are connected by the operation of the second valve V2.

Herein, the second branch line 26 is closed by the operation of the fourth valve V4.

Accordingly, the coolant passing through the electrical component 15 is flowed into the battery coolant line 21.

The coolant flowing from the coolant line 11 to the battery coolant line 21 may be supplied to the chiller 30 along the battery coolant line 21 after passing through the battery module 24 by the operation of the second water pump 22.

That is, the coolant passing through the electrical component 15 and the battery module 24 may continuously circulate along the coolant line 11, the first branch line 16, and the battery coolant line 21 without passing through the radiator 12.

Accordingly, the temperature of the coolant is increased by absorbing the waste heat from the electrical component 15 and the battery module 24.

The coolant with the increased temperature may be supplied to the chiller 30 provided at the battery coolant line 21.

That is, the waste heat generated by the electrical component 15 and the battery module 24 raises the temperature of the coolant circulating through the coolant line 11 and the battery coolant line 21, respectively.

In the heating apparatus 40, the coolant circulates along the heating line 41 through the operation of the third water pump 42.

The coolant line 11 and the heating line 41 may form the independent closed circuit through the operation of the third valve V3.

Thus, the coolant circulating through the heating line 41 may be supplied to the condenser 53 after passing through the heater 52a through the operation of the third water pump 42.

Here, the coolant heater 43 is operated when the temperature of the coolant circulating along the heating line 41 is lower than the target temperature, so that the coolant circulating in the heating line 41 may be heated.

On the other hand, when the air heater 45 is applied instead of the coolant heater 43, the air heater 45 operates when the temperature of the outside air passing through the heater 52a is lower than the target temperature, and the outside air introduced to the interior of the vehicle may be heated.

In the air conditioner 50, each constituent element operates to heat the vehicle interior. Thus, the refrigerant is circulated along the refrigerant line 51.

Here, the refrigerant line 51 connecting the condenser 53 and the evaporator 56 is opened through the operation of the first expansion valve 55.

The refrigerant connection line 61 is opened through operation of the second expansion valve 63.

Here, the first and second expansion valves 55 and 63 may expand the refrigerant supplied to the refrigerant connection line 61 and the refrigerant line 51 from the heat exchanger 54 so that the expanded refrigerant is supplied to the evaporator 56 and the chiller 30.

Also, when the temperature of the vehicle interior is low, the third expansion valve 65 may expand the refrigerant supplied from the condenser 53 to be introduced to the heat exchanger 54.

Accordingly, the heat exchanger 54 recovers the external heat while evaporating the expanded refrigerant through the heat exchange with the outside air.

Conversely, the third expansion valve 65 may inflow the refrigerant supplied from the condenser 53 to the heat exchanger 54 without expanding when the temperature of the vehicle interior is high.

Accordingly, the heat exchanger 54 may condense the refrigerant through heat exchange with the outside air.

Also, the coolant of which the temperature is increased by absorbing the waste heat of the electrical component 15 is recovered while increasing the temperature of the refrigerant supplied to the chiller 30 while passing through the chiller 30 through the operation of the first water pump 14.

That is, the chiller 30 receives the refrigerant supplied from the heat exchanger 54 and expanded through the operation of the second expansion valve 63 through the refrigerant connection line 61, and evaporates the supplied refrigerant through heat exchange with the coolant of which the temperature is increased while passing through the electrical component 15 and the battery module 24, thereby recovering the waste heat of the electrical component 15 and the battery module 24.

Next, the refrigerant passing through the chiller 30 is supplied to the accumulator 57 along the refrigerant connection line 61.

The refrigerant supplied to the accumulator 57 is separated into gas and liquid. Of the refrigerant separated by gas and liquid, the gas refrigerant is supplied to the compressor 59.

The refrigerant compressed from the compressor 59 with the high temperature high pressure inflows to the condenser 53.

Here, the refrigerant supplied to the condenser 53 may increase the temperature of the coolant by exchanging heat with the coolant circulating through the heating line 41. The coolant with raised temperature is supplied to the heater 52a.

On the other hand, the expanded refrigerant supplied to the evaporator 56 through the operation of the first expansion valve 55 exchanges heat with the outside air passing through the evaporator 56, and is then supplied to the compressor 59 through the accumulator 57 along the refrigerant line 51.

That is, the refrigerant passing through the evaporator 56 may be supplied to the compressor 59 along with the refrigerant introduced to the accumulator 57 through the refrigerant connection line 61.

The refrigerant compressed by the compressor 59 with high temperature and high pressure is then introduced to the condenser 53.

Here, the opening/closing door 52b is opened so that the outside air introduced to the HVAC module 52 and passing through the evaporator 56 passes through the heater sea.

That is, the outside air introduced to the HVAC module 52 is dehumidified while passing through the evaporator 56 by the refrigerant of the low temperature state introduced to the evaporator 56. Next, the outside air is converted into a high temperature state while passing through the heater 52a and inflowing to the vehicle interior, thereby heating and dehumidifying the interior of the vehicle.

That is, the heat pump system according to the present exemplary embodiment selectively absorbs the external heat depending on the interior temperature of the vehicle along with the waste heat generated from the electrical component 15 and the battery module 24 in the heating and dehumidification mode of the vehicle by being used to increase the temperature of the refrigerant, thereby reducing the power consumption of the compressor 59 and improving the heating efficiency.

In the present exemplary embodiment, the operation for the case of using the waste heat of the electrical equipment 15 in the heating mode of the vehicle without the operation of the air conditioner 50 is described with reference to FIG. 7.

Figure 7:
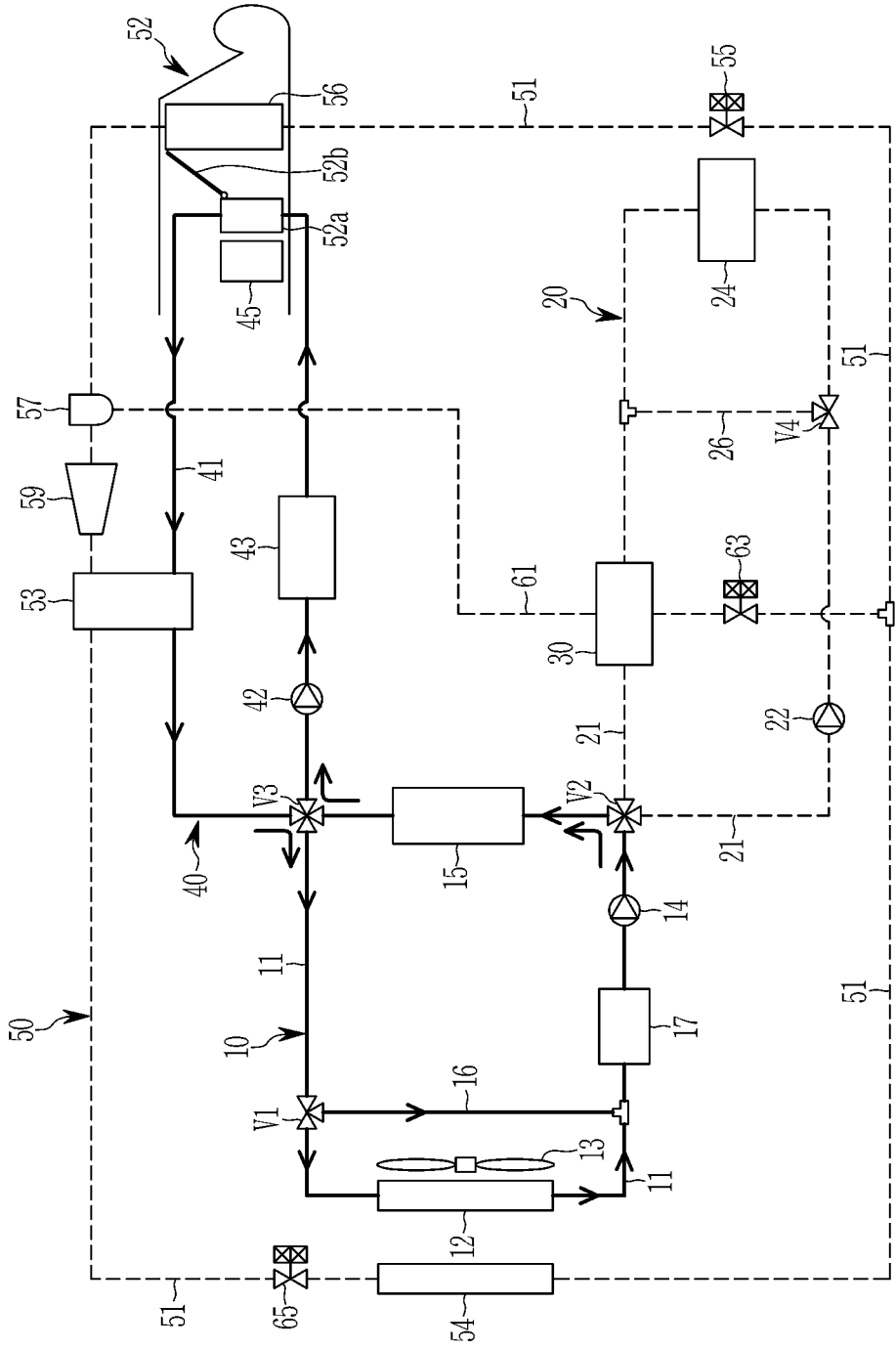
FIG. 7 illustrates an operational state diagram for recovering and cooling waste heat of an electrical component in a heating mode of a vehicle in a heat pump system for a vehicle according to an exemplary embodiment of the present invention.

FIG. 7 illustrates an operational state diagram for recovering and cooling waste heat of an electrical component in a heating mode of a vehicle in a heat pump system for a vehicle according to an exemplary embodiment of the present invention.

Referring to FIG. 7, the heat management system may recover the waste heat of the electric component 15 and use it for heating the interior of the vehicle.

First, in the cooling apparatus 10, the first water pump 14 is operated for circulation of the coolant. In this case, the air conditioner 50 is stopped.

Herein, the first branch line 16 is opened by the operation of the first valve V1.

At the same time, in the cooling apparatus 10, on the basis of the first branch line 16, a portion of the coolant line 11 connected to the radiator 12 is closed through the operation of the first valve V1.

In this state, the coolant passing through the electrical component 15 may be supplied to the chiller 30 along the opened first branch line 16 and the coolant line 11 without passage through the radiator 12 through the operation of the first water pump 14.

Meanwhile, in the battery cooling apparatus 20, the battery coolant line 21 is not connected to the coolant line 11 through the operation of the second valve V2.

Accordingly, the battery cooling apparatus 20 is stopped.

In this state, the coolant whose temperature is increased while passing through the electrical component 15 by the operation of the first water pump 14 is supplied to the heater 52a along the heating line 41 connected through the third valve V3 without passing through the radiator 12.

Here, the coolant introduced into the heating line 41 passes through the heater 52a by the operation of the third water pump 42. At this time, the coolant heater 43 is operated when the temperature of the coolant circulating along the heating line 41 is lower than the target temperature, so that the coolant circulating in the heating line 41 may be heated.

On the other hand, when the air heater 45 is applied instead of the coolant heater 43, the air heater 45 may be selectively operated depending on the temperature of the outside air passing through the heater sea.

Particularly, the air heater 45 may be operated when the temperature of the outside air passing through the heater 52a is lower than a target temperature, thereby heating the outside air flowing into the interior of the vehicle.

The air heater 45 is operated when the temperature of the outside air that has completed heat exchange with the high-temperature coolant while passing through the heater 52a is lower than a set temperature or a target heating temperature.

As a result, when the air heater 45 is operated, the outside air may be heated while passing through the air heater 45, to be introduced into the vehicle interior in a state where the temperature is raised.

In the present exemplary embodiment, the coolant discharged from the heater 52a is introduced into the coolant line 11 via the heating line 41 and the third valve V3. Then, the coolant is supplied to the electrical component 15 again along the first branch line 16 and the coolant line 11.

That is, the coolant passing through the electrical component 15 may continuously circulate along the coolant line 11, the heating line 41, and first branch line 16 without passing through the radiator 12. The temperature of the coolant is increased by absorbing the waste heat from the electrical component 15.

The coolant having the temperature that has been raised is introduced into the heating line 41 connected to the coolant line 11 through the operation of the third valve V3. Then, the high-temperature coolant introduced into the heating line 41 is supplied to the heater 52a.

Herein, the opening and closing door 52b is opened such that the outside air flowing into the HVAC module 52 passes through the heater sea.

Accordingly, the outside air introduced from the outside flows in a room temperature state in which it is not cooled when passing through the evaporator 56 to which no refrigerant is supplied. The introduced outside air may be converted into a high temperature state while passing through the heater sea, and flows into the vehicle, thereby heating the interior of the vehicle.

In other words, according to embodiments of the present invention, it is possible to recover the waste heat generated in the electrical component 15 while repeating the above-described process, and use the waste heat for interior heating, thereby reducing power consumption and improving overall heating efficiency.

On the other hand, in the process of heating the interior of the vehicle by recovering the waste heat of the electrical component 15 using the coolant, when the electrical component 15 is overheated, a portion of the coolant line 11 connected to the radiator 12, and a portion of the coolant line 11 connecting the radiator 12 and the reservoir tank 16 are opened through the operation of the first valve V1.

Herein, the first branch line 16 may maintain an open state.

Accordingly, the remaining coolant, which is not supplied to the heater 52a, is cooled through the radiator 12.

The coolant that has been completely cooled may recover waste heat while passing through the electrical component 15, and at the same time, may efficiently cool the electrical component 15, together with the coolant introduced into the reservoir tank 16 through the first branch line 16.

Specifically, when the electrical component 15 is overheated, the first valve V1 may open the coolant line 11 connected to the radiator 12 to allow some of the coolant passing through the electrical component 15 to flow into the first branch line 16 and the remaining coolant to flow into the radiator 12.

As a result, some coolant cooled in the radiator 12 may be supplied to the electrical component 15, thereby preventing the electrical component 15 from overheating.

Therefore, according to embodiments of the present invention, it is possible to recover the waste heat generated in the electrical component 15, and use the waste heat for interior heating, thereby reducing power consumption and improving overall heating efficiency.

At the same time, according to embodiments of the present invention, some coolant may be introduced into the radiator 12 through operation control of the first valve V1 capable of distributing the flow, to be cooled, and then be supplied to the electrical component 15, thereby efficiently cooling the electrical component 15 and ensuring the cooling performance of the electrical component 15.

An operation of the case of heating the battery module 24 will be described with respect to FIG. 8.

Figure 8:
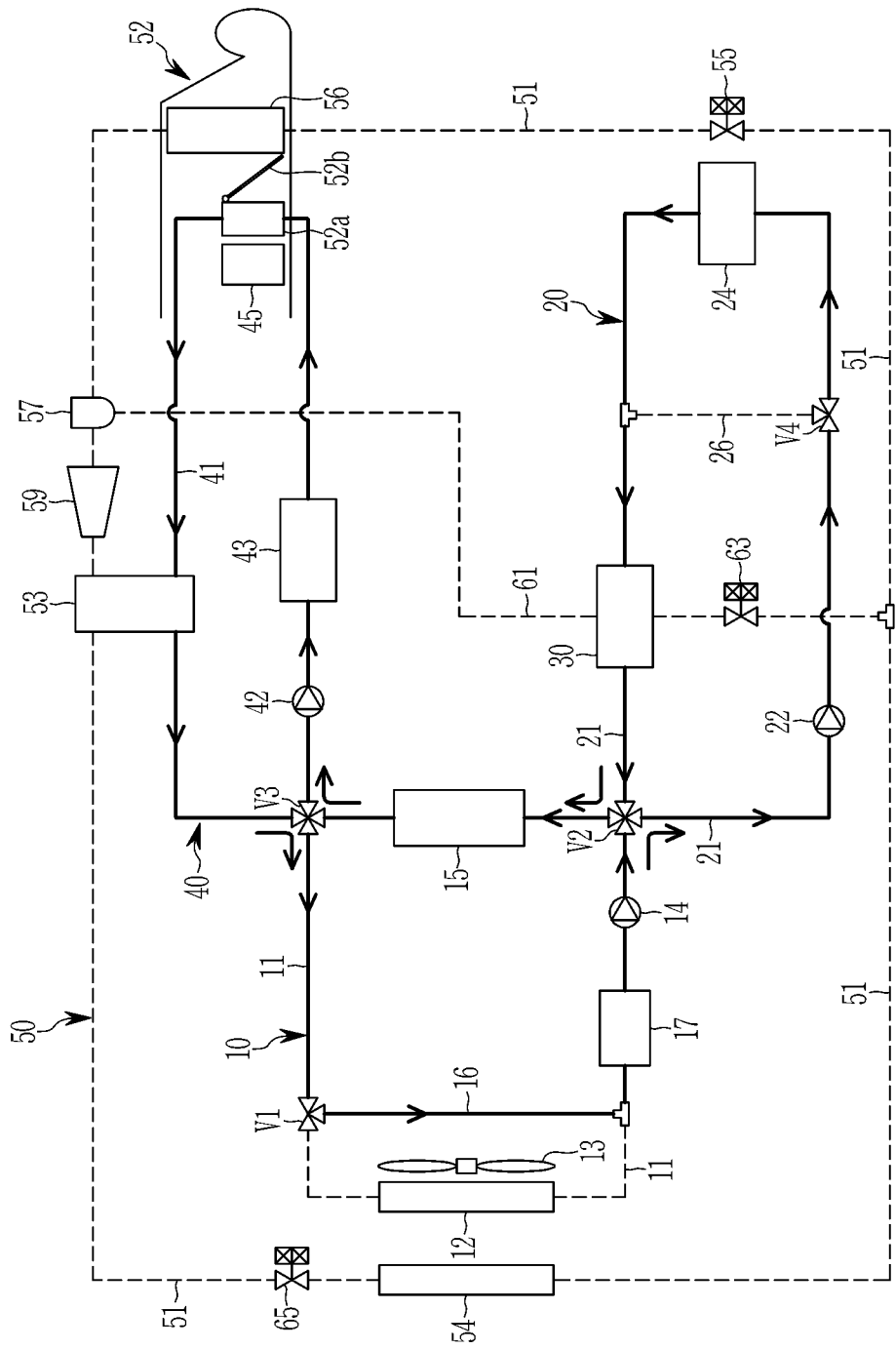
FIG. 8 illustrates an operational state diagram for heating of a battery module in a heat pump system for a vehicle according to an exemplary embodiment of the present invention.

FIG. 8 illustrates an operational state diagram for heating of a battery module in a heat pump system for a vehicle according to an exemplary embodiment of the present invention.

Referring to FIG. 8, the heat pump system may heat the battery module 26 by recovering the waste heat of the electrical component 15.

First, the first branch line 16 is opened in the cooling device 10 in a state in which the coolant line 11 connected to the radiator 12 is closed through the operation of the first valve V1. Here, the air conditioner 50 is stopped.

Meanwhile, in the battery cooling apparatus 20, the coolant line 11 and the battery coolant line 21 are connected through the operation of the second valve V2.

Herein, the second branch line 26 is closed through the operation of the fourth valve V4.

Accordingly, the coolant passing through the electrical component 15 is flowed into the battery coolant line 21. The coolant introduced from the coolant line 11 to the battery coolant line 21 may pass through the battery module 24 by the operation of the second water pump 22.

The coolant passing through the battery module 24 may be flowed into the coolant line 11 connected through the second valve V2.

Meanwhile, in the heating apparatus 40, the coolant line 11 and the heating line 41 are connected through the operation of the third valve V3.

In this state, the coolant whose temperature is increased while passing through the electrical component 15 by the operation of the first water pump 14 is flowed to the heating line 41 connected through the third valve V3 without passing through the radiator 12.

That is, the coolant with the increased temperature by the waste heat of the electrical component 15 in the cooling apparatus 11 may circulate through the heating line 41 through the operation of the third water pump V3.

Herein, the coolant heater 43 is operated to heat the coolant when the temperature of the coolant circulating along the heating line 41 is lower than the target temperature. Then, the coolant circulating in the heating line 41 rises in temperature as it passes through the coolant heater 43.

Accordingly, the coolant having an increased temperature while passing through the coolant heater 43 is flowed into the coolant line 11 from the heating line 41 through the third valve V3.

Then, the coolant passes through the reservoir tank 17 through the first branch line 16 and the coolant line 11, and may be supplied to the battery module 24 connected through the battery coolant line 21.

As a result, the high-temperature coolant may raise the temperature of the battery module 24.

As a result, according to embodiments of the present invention, it is possible to rapidly increase the temperature of the battery module 24 while repeating the above-described process, thereby efficiently managing the temperature of the battery module 24.

Thus, if the heat pump system for the vehicle according to an exemplary embodiment of the present invention as described above is applied, the temperature of the battery module 24 may be adjusted depending on the mode of the vehicle by using one chiller 30 for performing heat exchange between the coolant and the refrigerant, and the interior of the vehicle may be heated by using the coolant, thereby simplifying the entire system.

According to embodiments of the present invention, it is also possible to improve the heating efficiency by recovering waste heat from the electrical component 15 and using it for interior heating.

In addition, according to embodiments of the present invention, it is possible to optimize the performance of the battery module 24 by efficiently controlling the temperature of the battery module 24, and increase an overall travel distance of the vehicle through efficient management of the battery module 24.

Further, embodiments of the present invention may use the coolant heater 43 applied to the heating apparatus 40 to warm up the battery module 24 or to assist in an interior heating of the vehicle, thereby reducing the cost and weight.

Furthermore, an embodiment of the present invention selectively uses the external heat and the waste heat of the electrical component 15 and the battery module 24 in the heating mode of the vehicle, thereby improving the heating efficiency.

An embodiment of the present invention also improves the condensing or evaporation performance of the refrigerant by using the condenser 53 and the heat exchanger 54, thereby improving the cooling performance and reducing the power consumption of the compressor 59.

Furthermore, embodiments of the present invention may reduce production cost and weight and improve space utilization by simplifying the entire system.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A system for a vehicle, the system comprising:
   a cooling apparatus including a radiator, a first water pump, a first valve, and a reservoir tank which are connected through a coolant line, the cooling apparatus configured to circulate a coolant in the coolant line to cool at least one electrical component provided along the coolant line;
   a battery cooling apparatus including a battery coolant line connected to the coolant line through a second valve, and a second water pump and a battery module which are connected through the battery coolant line and configured to circulate the coolant in the battery module;

a heating apparatus including a heating line connected to the coolant line through a third valve and configured to heat a vehicle interior by using the coolant, a third water pump provided on the heating line, and a heater;

an air conditioner including a condenser that is connected to the heating line and is configured to pass the coolant circulating through the heating apparatus; and a chiller provided in the battery coolant line between the second valve and the battery module, connected to a refrigerant line of the air conditioner through a refrigerant connection line, and configured to regulate a temperature of the coolant by performing heat exchange between the coolant that circulates the battery coolant line and a refrigerant that is selectively supplied from the air conditioner.

2. The system of claim 1, wherein:
the cooling apparatus is provided with a first branch line;
a first end of the first branch line is connected to the first valve and a second end of the first branch line is connected to the coolant line between the radiator and the first water pump; and
the heater is provided inside an HVAC module included in the air conditioner.

3. The system of claim 2, wherein the battery module is configured to be heated and wherein when the battery module is heated:
the first valve is configured to be operated to open the first branch line in a state in which the coolant line connected to the radiator is closed;
the second valve is configured to be operated to connect the coolant line and the battery coolant line;
the first and second water pumps are configured to be operated to circulate the coolant along the coolant line and the battery coolant line;
in the heating apparatus, the third valve is configured to be operated to connect the coolant line and the heating line;
in the cooling apparatus, the third water pump is configured to be operated to circulate the coolant with the temperature increased by waste heat of the electrical component through the heating line; and
the system is configured so that a high-temperature coolant introduced from the heating line to the coolant line is flowed into the battery coolant line through the first branch line and the coolant line, and is supplied to the battery module.

4. The system of claim 2, wherein the air conditioner includes:
the HVAC module, wherein the HVAC module includes an evaporator that is connected through the refrigerant line and an opening and closing door configured to control outside air passing through the evaporator to be selectively introduced into the heater depending on cooling, heating, and heating and dehumidification modes of the vehicle;
the condenser, wherein the condenser is connected with the heating line and configured to circulate a coolant therein to perform heat exchange between the coolant and a refrigerant supplied through the refrigerant line;
a compressor connected between the evaporator and the condenser through the refrigerant line;
a heat exchanger provided on the refrigerant line between the condenser and the evaporator;

a first expansion valve provided in the refrigerant line between the heat exchanger and the evaporator;
a second expansion valve provided in the refrigerant connection line;
an accumulator provided in the refrigerant line between the evaporator and the compressor and connected to the refrigerant connection line; and
a third expansion valve provided in the refrigerant line between the condenser and the heat exchanger.

5. The system of claim 4, wherein the heat exchanger is configured to additionally condense or evaporate the refrigerant condensed in the condenser through heat exchange with the outside air depending on a selective operation of the third expansion valve.

6. The system of claim 4, wherein the second expansion valve is configured to expand the refrigerant introduced through the refrigerant connection line to flow to the chiller when cooling the battery module by the refrigerant.

7. The system of claim 4, wherein the third expansion valve is configured to selectively expand the refrigerant introduced to the heat exchanger in the heating mode and the heating and dehumidification mode of the vehicle.

8. The system of claim 4, wherein:
a first end of the refrigerant connection line is connected to the refrigerant line between the heat exchanger and the first expansion valve; and
a second end of the refrigerant connection line is connected to the accumulator.

9. The system of claim 4, wherein the HVAC module further includes an air heater provided at an opposite side of the evaporator, with the heater interposed therebetween and configured to selectively heat outside air passing through the heater.

10. The system of claim 9, wherein the air heater is configured to be operated to raise a temperature of the outside air passing through the heater when a temperature of a coolant supplied to the heater is lower than a target temperature for interior heating.

11. The system of claim 4, wherein the battery module is configured to be cooled in a cooling mode of the vehicle, wherein when the battery module is cooled in the cooling mode:
the first water pump in the cooling apparatus is configured to be operated to circulate a coolant through the coolant line;
the first valve is configured to be operated to close the first branch line;
the second valve is configured to be operated to form an independent closed circuit in the coolant line and the battery coolant line;
in the battery cooling apparatus, the second water pump is configured to be operated to supply the coolant which passes through the chiller to the battery module along the battery coolant line;
in the heating apparatus, the third valve is configured to be operated to connect the coolant line and the heating line so that the coolant is supplied from the cooling apparatus;
in the air conditioner, the second expansion valve is configured to be operated to open the refrigerant connection line, and the refrigerant is configured to circulate along the refrigerant line and the refrigerant connection line;
the first and second expansion valves are configured to expand the refrigerant so that the expanded refrigerant is respectively supplied to the evaporator and the chiller; and the third expansion valve is configured to inflow the refrigerant supplied from the condenser to the heat exchanger.

12. The system of claim 11, wherein:
the heating apparatus is configured to supply the coolant supplied from the cooling apparatus by operation of the third water pump to the condenser; and
the condenser is configured to condense the refrigerant through heat exchange with the coolant, and the heat exchanger is configured to additionally condense the refrigerant introduced from the condenser through heat exchange with the outside air.

13. The system of claim 4, wherein the system is configured to recover waste heat of an external heat source, the electrical component, and the battery module in a heating mode of the vehicle, and wherein when recovering the waste heat:
the first valve is configured to be operated to open the first branch line;
in the cooling apparatus, on the basis of the first branch line, a portion of the coolant line connected to the radiator is closed, and the first water pump is configured to be operated to circulate the coolant passing through the electrical component along the opened first branch line and the coolant line without passage through the;
in the battery cooling apparatus, the second valve is configured to be operated to connect the coolant line and the battery coolant line, and the second water pump is configured to be operated to supply the coolant passing through the battery module to the chiller;
the third valve is configured to be operated to form an independent closed circuit in the coolant line and the heating line;
in the heating apparatus, the third water pump is configured to be operated to circulate the coolant along the heating line;
in the air conditioner, the first expansion valve is configured to be operated to close the refrigerant line connecting the condenser and the evaporator;
the second expansion valve is configured to be operated to open the refrigerant connection line;
the second expansion valve is configured to expand the refrigerant supplied to the refrigerant connection line to be supplied to the chiller; and
the third expansion valve is configured to expand the refrigerant supplied from the condenser to be supplied to the heat exchanger.

14. The system of claim 4, wherein the battery cooling apparatus further includes a second branch line, a first end of the second branch line is connected to a fourth valve provided between the second water pump and the battery module, and a second end of the second branch line is connected to the battery coolant line connecting the battery module and the chiller.

15. The system of claim 14, wherein the system is configured to recover waste heat of an external heat source and the electrical component in a heating mode of the vehicle, and wherein when recovering the waste heat:
the first valve is configured to open the first branch line;
in the cooling apparatus, on the basis of the first branch line, a portion of the coolant line connected to the radiator is closed, and the first water pump is configured to be operated to circulate the coolant passing through the electrical component along the opened first branch line and the coolant line without passage through the radiator;

in the battery cooling apparatus, the second valve is configured to be operated to connect the coolant line and the battery coolant line, the fourth valve is configured to be operated to open the second branch line, the battery coolant line is connected to the battery module based on the second branch line being open, and the second water pump is configured to be operated to circulate the coolant along the battery coolant line and the second branch line;
the first and second water pumps are configured to supply the coolant passing through the electrical component to the chiller;
the third valve is configured to be operated to form an independent closed circuit in the coolant line and the heating line;
in the heating apparatus, the third water pump is configured to be operated to circulate the coolant along the heating line;
in the air conditioner, the first expansion valve is configured to be operated to close the refrigerant line connecting the condenser and the evaporator;
the second expansion valve is configured to be operated to open the refrigerant connection line;
the second expansion valve is configured to expand the refrigerant supplied to the refrigerant connection line to be supplied to the chiller; and
the third expansion valve is configured to expand the refrigerant supplied from the condenser to be supplied to the heat exchanger.

16. The system of claim 4, wherein, in the heating and dehumidification mode of the vehicle:
the first valve is configured to be operated to open the first branch line;
in the cooling apparatus, on the basis of the first branch line, a portion of the coolant line connected to the radiator is closed, and the first water pump is configured to be operated to circulate the coolant passing through the electrical component along the opened first branch line and the coolant line without passage through the radiator;
in the battery cooling apparatus, the second valve is configured to be operated to connect the coolant line and the battery coolant line, and the second water pump is configured to be operated to supply the coolant passing through the battery module to the chiller;
the coolant discharged from the chiller is configured to flow into the coolant line connected to the battery coolant line through the second valve;
the third valve is configured to be operated to form an independent closed circuit in the coolant line and the heating line;
in the heating apparatus, the third water pump is configured to be operated to circulate the coolant along the heating line;
in the air conditioner, the first and second expansion valves are configured to circulate the refrigerant along the refrigerant line and the refrigerant connection line, respectively; and
the first and second expansion valves are configured to expand the refrigerant so that the expanded refrigerant is respectively supplied to the evaporator and the chiller.

17. The system of claim 16, wherein:
the third expansion valve is configured to expand the refrigerant supplied from the condenser to be introduced to the heat exchanger when the temperature of the vehicle interior is low; and when the temperature of the vehicle interior is high, the refrigerant supplied from the condenser is configured to be introduced to the heat exchanger without an expanded state.

18. A method of operating a heat pump system of a vehicle, wherein the vehicle comprises:
a cooling apparatus including a radiator, a first water pump, a first valve, and a reservoir tank which are connected through a coolant line, the cooling apparatus having a first branch line with a first end connected to the first valve and a second end connected to the coolant line between the radiator and the first water pump, wherein the cooling apparatus is configured to circulate a coolant in the coolant line to cool at least one electrical component provided along the coolant line;
a battery cooling apparatus including a battery coolant line connected to the coolant line through a second valve, and a second water pump and a battery module which are connected through the battery coolant line and configured to circulate the coolant in the battery module;
a heating apparatus including a heating line connected to the coolant line through a third valve and configured to heat a vehicle interior by using the coolant, a third water pump provided on the heating line, and a heater;
an air conditioner including a condenser that is connected to the heating line and is configured to pass the coolant circulating through the heating apparatus, wherein the heater is provided inside an HVAC module included in the air conditioner; and
a chiller provided in the battery coolant line between the second valve and the battery module, connected to a refrigerant line of the air conditioner through a refrigerant connection line, and configured to regulate a temperature of the coolant by performing heat exchange between the coolant that circulates the battery coolant line and a refrigerant that is selectively supplied from the air conditioner;
wherein the method comprises using the coolant to cool the electrical component and the battery module, the method comprising:
operating the first valve to close the first branch line;
operating the first water pump to supply the coolant cooled in the radiator and stored in the reservoir tank to the electrical component; and
operating the second valve to supply the coolant stored in the reservoir tank to the battery module while the coolant circulates through the battery coolant line connected to the coolant line.

19. A method of operating a heat pump system of a vehicle, wherein the vehicle comprises:
a cooling apparatus including a radiator, a first water pump, a first valve, and a reservoir tank which are connected through a coolant line, the cooling apparatus having a first branch line with a first end connected to the first valve and a second end connected to the coolant line between the radiator and the first water pump, wherein the cooling apparatus is configured to circulate a coolant in the coolant line to cool at least one electrical component provided along the coolant line;
a battery cooling apparatus including a battery coolant line connected to the coolant line through a second valve, and a second water pump and a battery module which are connected through the battery coolant line and configured to circulate the coolant in the battery module;
a heating apparatus including a heating line connected to the coolant line through a third valve and configured to heat a vehicle interior by using the coolant, a third water pump provided on the heating line, and a heater;
an air conditioner including a condenser that is connected to the heating line and is configured to pass the coolant circulating through the heating apparatus, wherein the heater is provided inside an HVAC module included in the air conditioner; and
a chiller provided in the battery coolant line between the second valve and the battery module, connected to a refrigerant line of the air conditioner through a refrigerant connection line, and configured to regulate a temperature of the coolant by performing heat exchange between the coolant that circulates the battery coolant line and a refrigerant that is selectively supplied from the air conditioner;
wherein the method uses waste heat of the electrical component in a heating mode of the vehicle without operation of the air conditioner, the method comprising:
operating the first valve to open the first branch line, wherein in the cooling apparatus, on the basis of the first branch line, the coolant line connected to the radiator is closed;
operating the second valve so that the battery coolant line is not connected to the coolant line;
stopping the battery cooling apparatus and the air conditioner;
operating the first water pump to supply the coolant whose temperature is increased while passing through the electrical component to the heater along the heating line connected through the third valve without passing through the radiator; and
circulating the coolant discharged from the heater along the heating line, the third valve, the coolant line, and the first branch line.

20. The method of claim 19, wherein the first valve opens the coolant line connected to the radiator to allow some of the coolant passing through the electrical component to flow into the first branch line and remaining coolant to flow into the radiator when the electrical component is overheated.

* * * * *